(12) United States Patent
Ross et al.

(10) Patent No.: US 12,496,536 B2
(45) Date of Patent: Dec. 16, 2025

(54) ESSENTIAL OIL EXTRACTOR

(71) Applicant: Essential Extraction Corp., Loveland, CO (US)

(72) Inventors: David Ross, Fort Collins, CO (US); James Ramsey, Surprise, AZ (US)

(73) Assignee: Essential Extraction Corp., Loveland, CO (US)

( * ) Notice: Subject to any disclaimer, the term of this patent is extended or adjusted under 35 U.S.C. 154(b) by 795 days.

(21) Appl. No.: 17/714,856

(22) Filed: Apr. 6, 2022

(65) Prior Publication Data
US 2022/0355220 A1 Nov. 10, 2022

Related U.S. Application Data

(60) Provisional application No. 63/171,642, filed on Apr. 7, 2021.

(51) Int. Cl.
*B01D 11/02* (2006.01)
*C11B 9/02* (2006.01)

(52) U.S. Cl.
CPC ...... *B01D 11/0288* (2013.01); *B01D 11/0207* (2013.01); *C11B 9/025* (2013.01)

(58) Field of Classification Search
CPC .......................... B01D 11/0288; C11B 9/025
See application file for complete search history.

(56) References Cited

U.S. PATENT DOCUMENTS

| | | | |
|---|---|---|---|
| 10,081,780 B1* | 9/2018 | Baker, Jr. | B01D 11/0203 |
| 10,279,294 B2* | 5/2019 | Fogelman | B01D 11/0292 |
| 10,625,175 B2 | 4/2020 | Jackson | |
| 11,235,261 B2 | 2/2022 | Jackson | |
| 2017/0252385 A1* | 9/2017 | Jones | B01D 11/0288 |
| 2021/0269737 A1* | 9/2021 | Wirtz | B01D 11/0288 |
| 2022/0305403 A1* | 9/2022 | McGhee | B01D 11/0207 |

OTHER PUBLICATIONS

U.S. Appl. No. 63/171,642, filed Apr. 7, 2021.
U.S. Appl. No. 63/284,206, filed Nov. 30, 2021.

* cited by examiner

*Primary Examiner* — Kevin Joyner
(74) *Attorney, Agent, or Firm* — Craig R. Miles; CR MILES P.C.

(57) ABSTRACT

Embodiments of the inventive technology may be described as a plant biomass extraction apparatus for production of liquid extract from plant biomass, using carbon dioxide, including one or more of: carbon dioxide chiller, extraction chamber, extract collection chamber, at least one valve, and fluid conveyance componentry, configured to define a closed loop for passive, pump-free extract production. Certain embodiments may avoid saturation of the extractant, and the resultant compromise of process effectiveness that may be seen in those apparatus relying on mechanical pump(s) for flow and/or may present a tabletop, closed loop liquid carbon dioxide extraction apparatus for the production of an extract from plant biomass or other matrix.

20 Claims, 19 Drawing Sheets

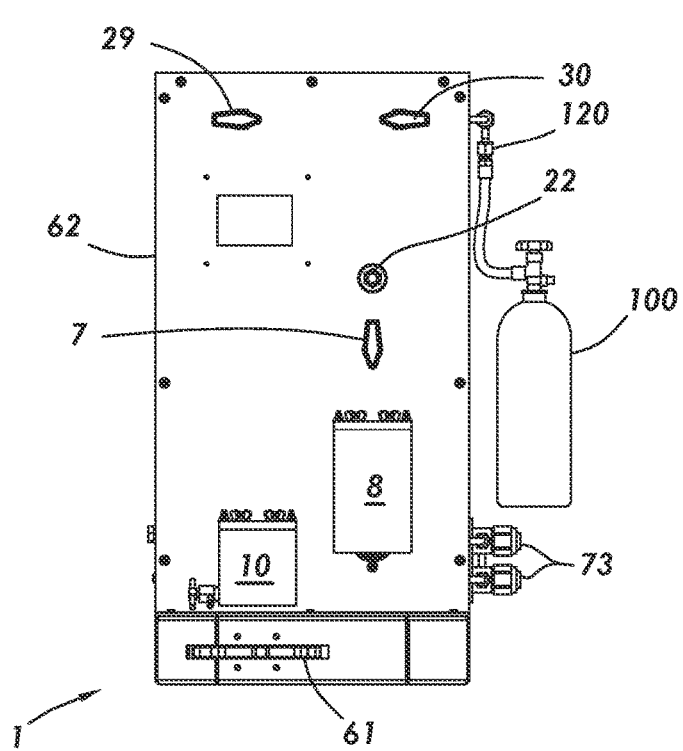
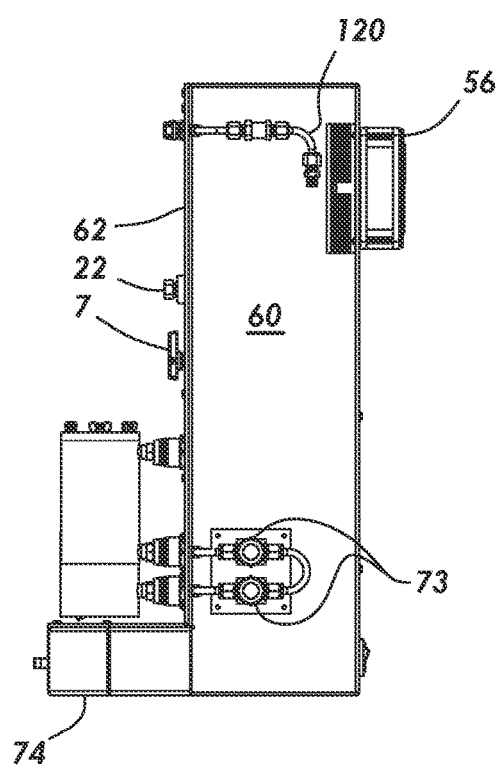
FIG. 2A          FIG. 2B
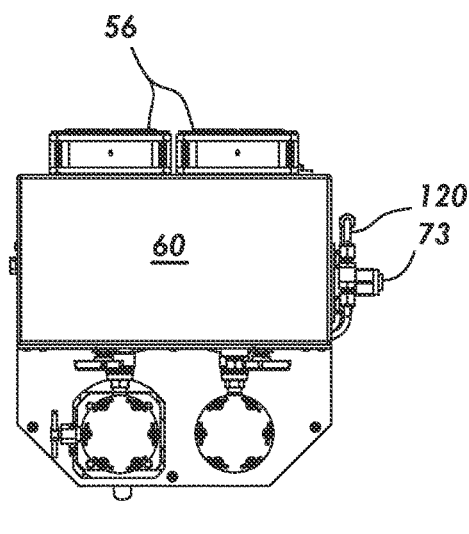
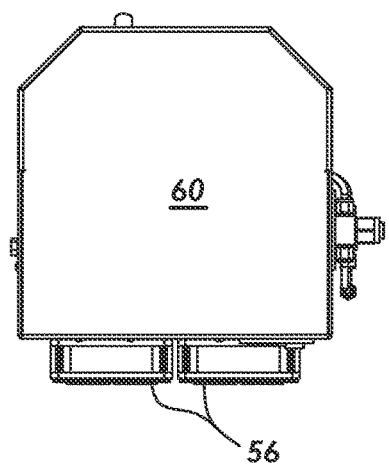
FIG. 2C          FIG. 2D

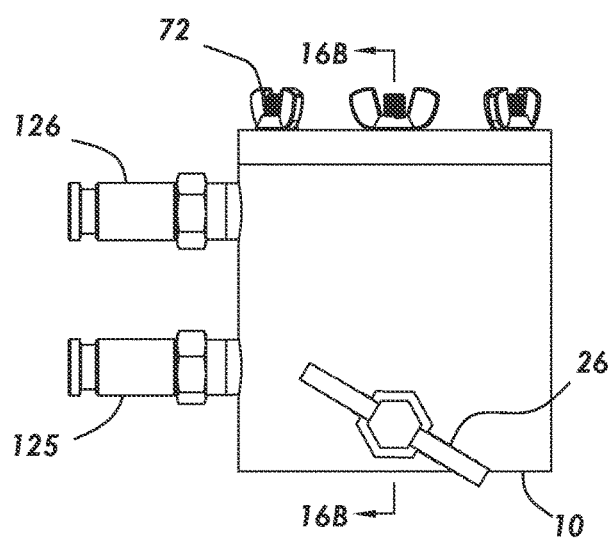
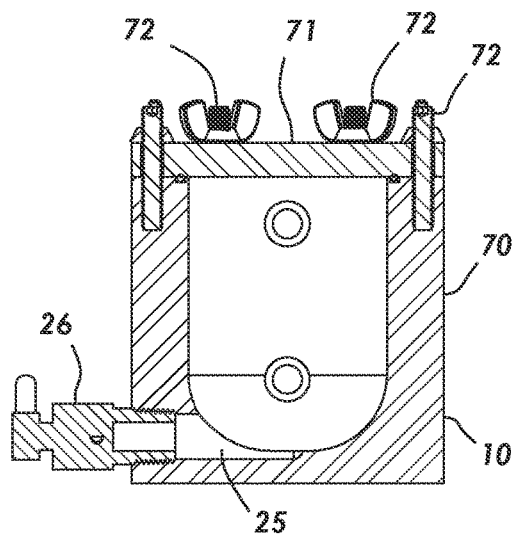
FIG. 16A
FIG. 16B
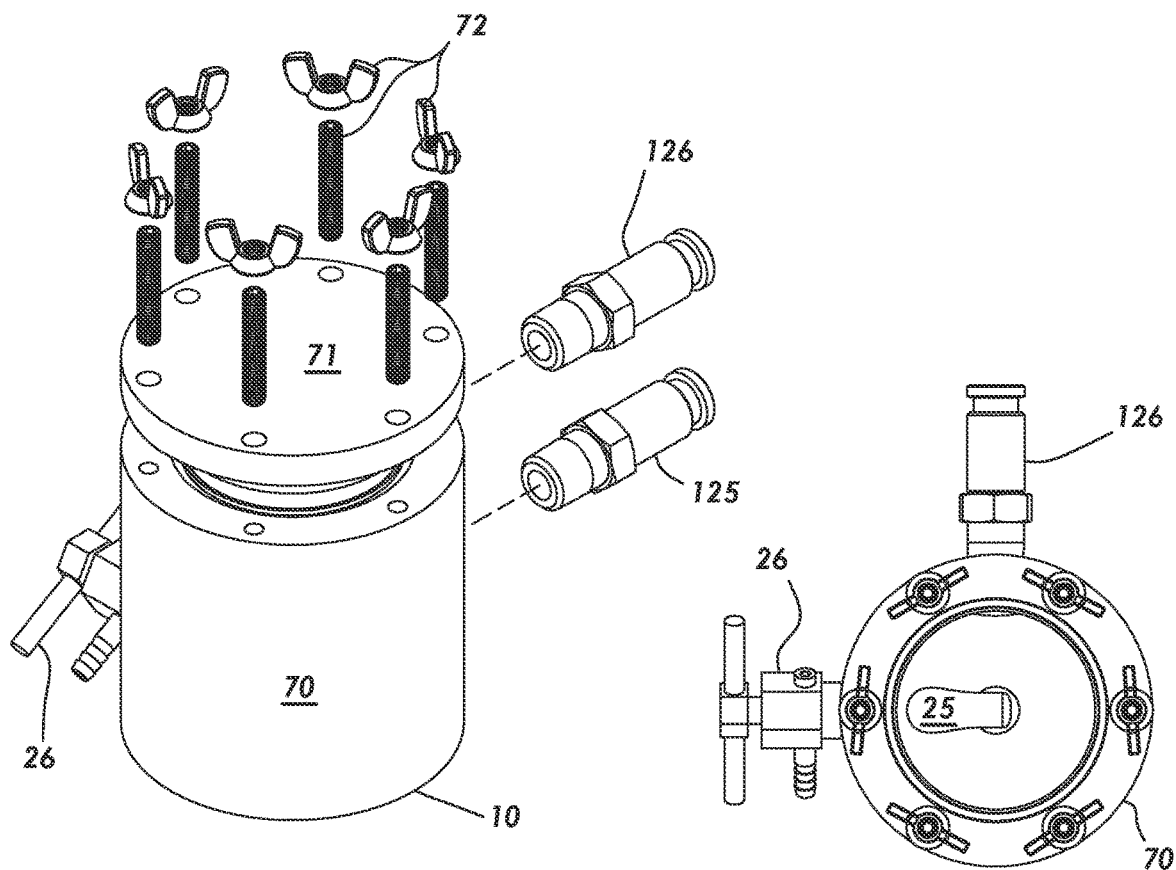
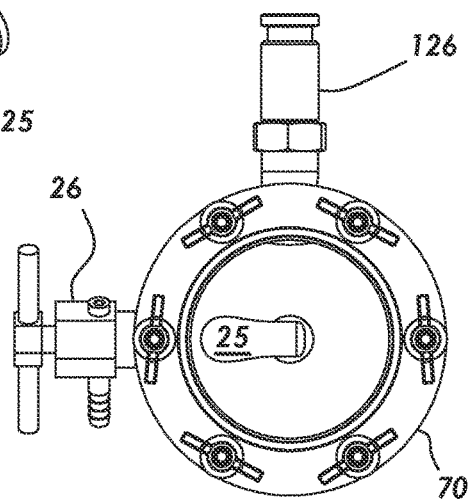
FIG. 16C
FIG. 16D

ESSENTIAL OIL EXTRACTOR

This United States Non-Provisional patent application claims the benefit of U.S. Provisional Patent Applications No. 63/284,206, filed Nov. 30, 2021, and No. 63/171,642, filed Apr. 7, 2021, each hereby incorporated by reference herein.

I. SUMMARY

Generally, certain embodiments of the inventive technology may be described as a plant biomass extraction apparatus for production of liquid extract from plant biomass, using carbon dioxide, including one or more of: carbon dioxide chiller, extraction chamber, extract collection chamber, at least one valve, and fluid conveyance componentry, configured to define a closed loop for passive, pump-free extract production. Certain embodiments may avoid saturation of the extractant, and a resultant compromise of processing effectiveness that may be seen in those apparatus relying on mechanical pump(s) for flow. Certain embodiments may present a tabletop, closed loop liquid carbon dioxide extraction apparatus for the production of an extract from plant biomass or other matrix.

Naturally, further objects of the invention are disclosed throughout other areas of the specification, drawings, photographs, and claims.

II. BRIEF DESCRIPTION OF THE DRAWINGS

FIG. 2A is front view of an embodiment of the inventive technology with front door closed.

FIG. 2B is a right side view of an embodiment of the inventive technology with front door closed.

FIG. 2C is a top view of an embodiment of the inventive technology with front door closed.

FIG. 2D is a bottom view of an embodiment of the inventive technology with front door closed.

FIG. 16A shows a left side view of an extract collection chamber as appears in an embodiment of the inventive technology.

FIG. 16B shows a left side cross-section view (Section 16B-16B) of an extract collection chamber as appears in an embodiment of the inventive technology.

FIG. 16C shows an exploded, front right aerial perspective view of an extract collection chamber as appears in an embodiment of the inventive technology.

FIG. 16D shows a top view with lid hidden (to show bottom inner surface of chamber) of an extract collection chamber as appears in an embodiment of the inventive technology.

III. DETAILED DESCRIPTION OF THE INVENTION

Figure 1:
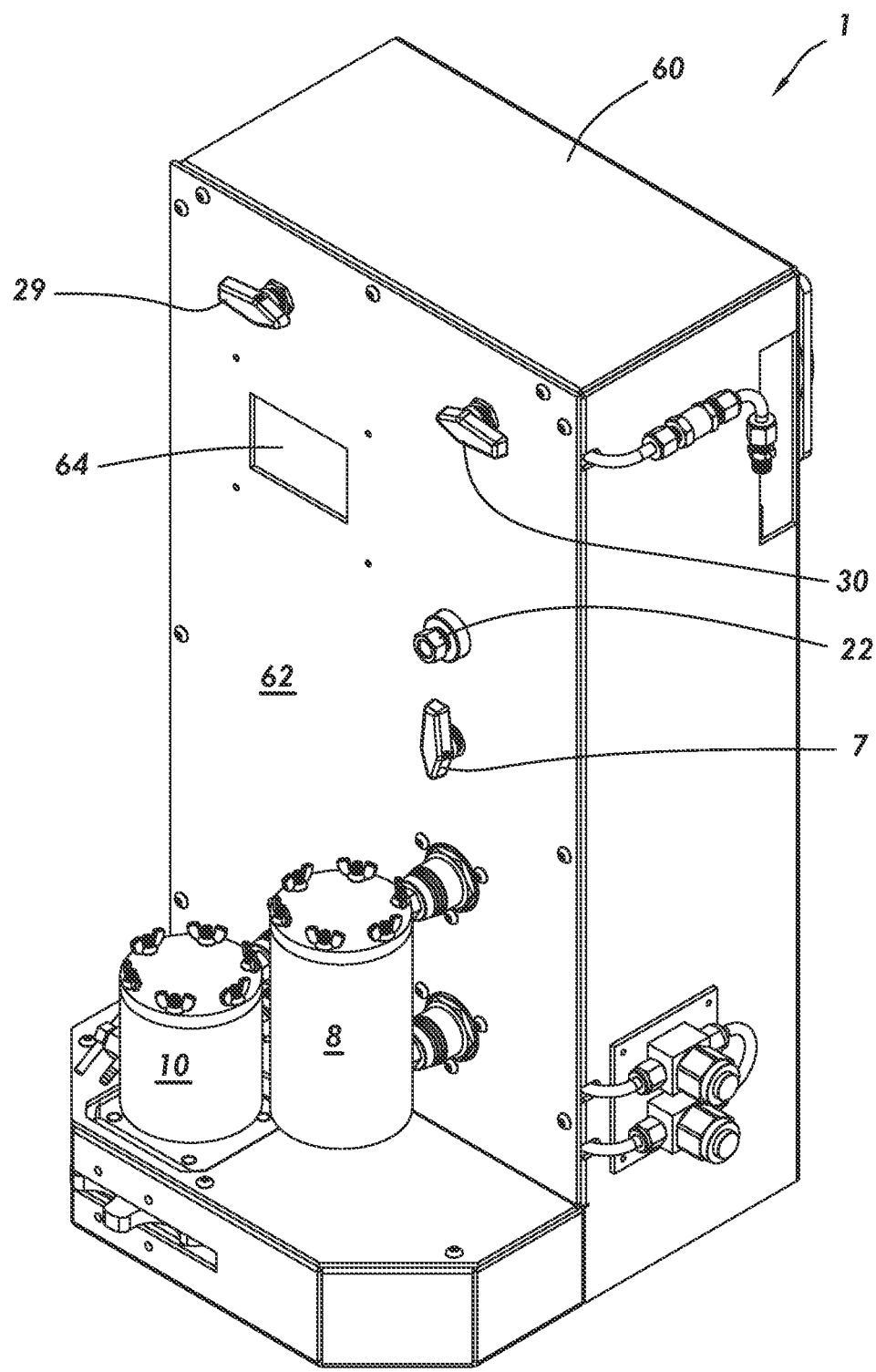
FIG. 1 is a right front aerial perspective view of an embodiment of the inventive technology with front door closed.
Figure 3:
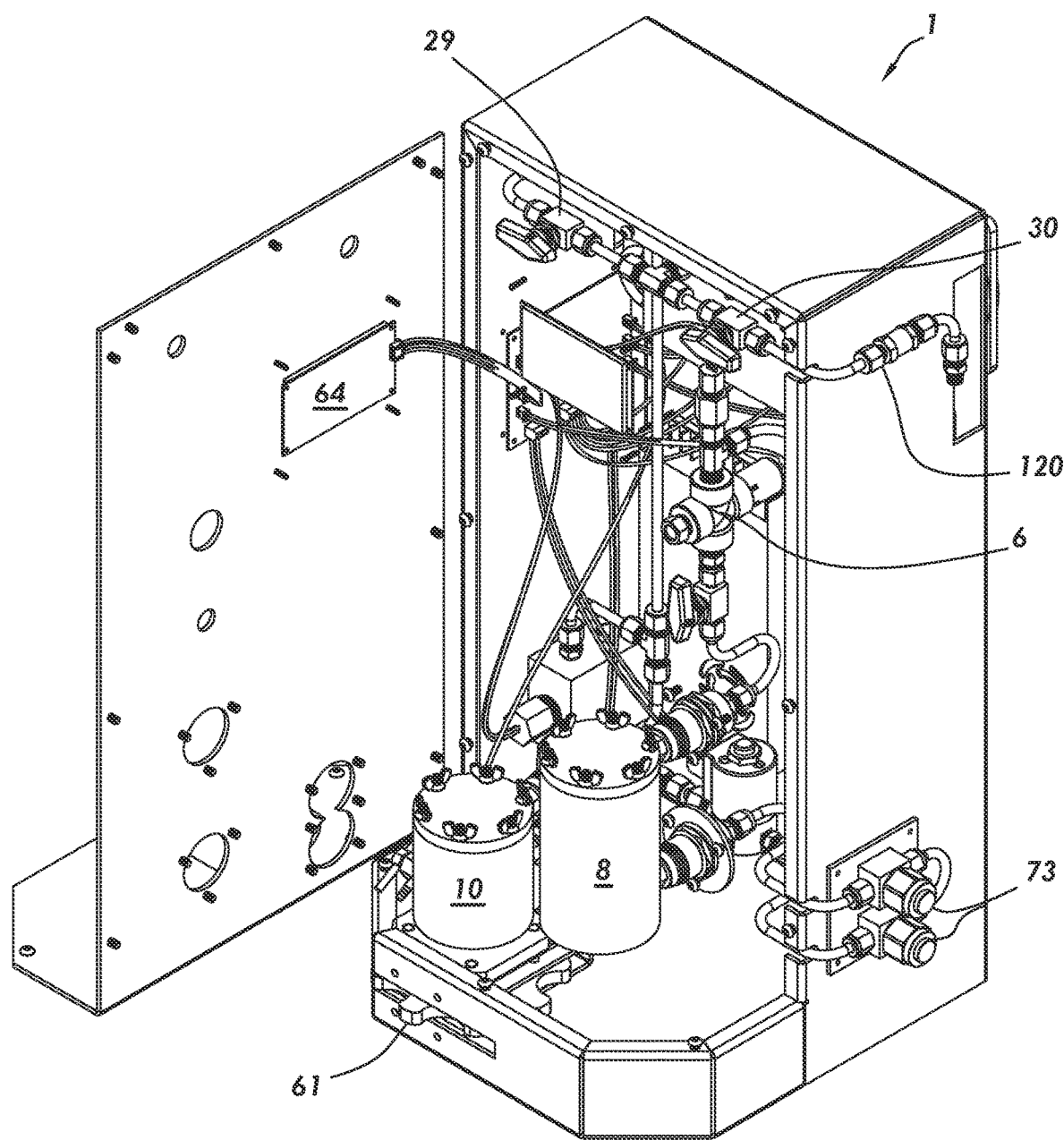
FIG. 3 is a front right aerial perspective view of an embodiment of the inventive technology with front door open (at 90° angle).

The inventive technology may employ the use of extractants—substances that, when placed into contact with a matrix such as plant biomass (3) under certain conditions (e.g., pressure and/or temperature), may act as solvents of certain components, i.e., extracts (e.g., lavender oil, CBD, essential oils generally) of that matrix. While the inventive technology as described herein focuses on the use of (liquid) carbon dioxide as the extractant, the inventive technology is not limited to simply carbon dioxide.

For the purposes of the inventive technology, the term "matrix" encompasses any material through which an extractant can effuse, and without limitation to the breadth of the foregoing, illustrative examples of matrices include: plant biomass (3) (whether fresh or dry) (as illustrative examples: bark, wood, leaves, stems, roots, flowers, fruits, seeds, berries or parts thereof and without limitation to the breadth of the forgoing: tobacco plant, *eucalyptus* plant, rosemary plant, mango plant, tea plant, *cannabis* plant, neem plant, algae, and fungi, and in particular plant flowers (whether fresh or day) such as lavender flower, chamomile flower, marigold flowers, tea flowers, *magnolia* flower, *cannabis* flowers, and hops flowers, grains (such as corn, wheat, rye, and oats), coffee, seeds (as illustrative examples: grape seeds, rape seeds, sunflower seed, sesame seed, passion fruit seeds, canola seeds, mustard seeds, flax seeds, cranberry seeds, *cannabis* seeds, or celery seeds), spices (as illustrative examples: ginger, clove bud, nutmeg, aniseed, coriander, pepper, cinnamon bark, cumin, marjoram, rosemary, sage, and thyme)), animal tissues (as illustrative examples: mammalian, bird, fish, or crustacean sources), soil, foods, filtering media, or combinations thereof, whether whole or comminuted. Embodiments of the inventive technology may be described with respect to processing of a particular type of matrix, plant biomass (3), but it should be understood that any of a variety of matrices can potentially be processed by its various embodiments, including but not limited to those matrices specifically identified herein.

For the purposes of the inventive technology, the term "*cannabis* plant(s)" encompasses plants in the *Cannabis* genus and without limitation to the breadth of the foregoing includes *Cannabis sativa, Cannabis indica,* and *Cannabis ruderalis* along with the variants and strains which are the result of genetic crosses, self-crosses or hybrids thereof or genetically modified strains, which may naturally contain different amounts of individual cannabinoids.

For the purposes of the inventive technology, the term "*cannabis* plant material" encompasses plant material derived from one or more *cannabis* plants regardless of the part of the *cannabis* plant or whether fresh or dried *cannabis* biomass.

For the purposes of the inventive technology, the term "extract" encompasses any component contained in a matrix (or as released from that matrix), and without limitation to the breadth of the foregoing, includes: any plant oils, any essential oils (as but one of many example, lavender oil), any botanical oils, seed oils (as illustrative examples: corn seed oil, grape seed oil, rape seed oil, sunflower oil, coconut oil, sesame seed oil, passion fruit seed oil, canola seed oil, mustard seed oil, *cannabis* seed oil, flax seed oil), grain oils (as illustrative examples: wheat oil, rye oil, oat oil), spice oils (as illustrative examples: ginger oil, clove bud oil, nutmeg oil, celery seed oil, aniseed oil, coriander oil, pepper oleoresin and oil, cinnamon oil, cumin oil, marjoram oil, rosemary oil, sage oil, thyme oil), flower oil (as illustrative examples, oil of any flower specified herein), flavors, natural ingredients, botanical drug substances (for example cannabinoids such as $\Delta^9$-tetrahydrocannabinol $\Delta^9$-THC, $\Delta^8$-tetrahydrocannabinol $\Delta^8$-THC, cannabichromene CBC, CBD, cannabidiol CBD, CBDA, cannabigerol CBG, cannabinidiol CBND, cannabinol CBN carboxylic acids thereof) bitters, food colors (such as paprika color), caffeine, nicotine, food colors, lanolin, cholesterol, antioxidants, lipids, free fatty acids, phosphatids (hydratable and non-hydratable), pesticides, or combinations thereof. For the purposes of the inventive technology, the term "botanical drug substances" encompasses an extract (2) which fulfils the definition of a "botanical drug substance" provided in the Guidance for Industry Botanical Drug Products, June 2004, US Department of Health and Human Services, Food and Drug Administration Centre for Drug Evaluation and Research of: "A drug substance derived from one or more plants, algae, or macroscopic fungi. It is prepared from botanical raw materials by one or more of the following processes: pulverization, decoction, expression, aqueous extraction, ethanolic extraction, or other similar processes."

The inventive technology, in its various embodiments, may include one or more of the componentry indicated and/or described herein.

Figure 4:
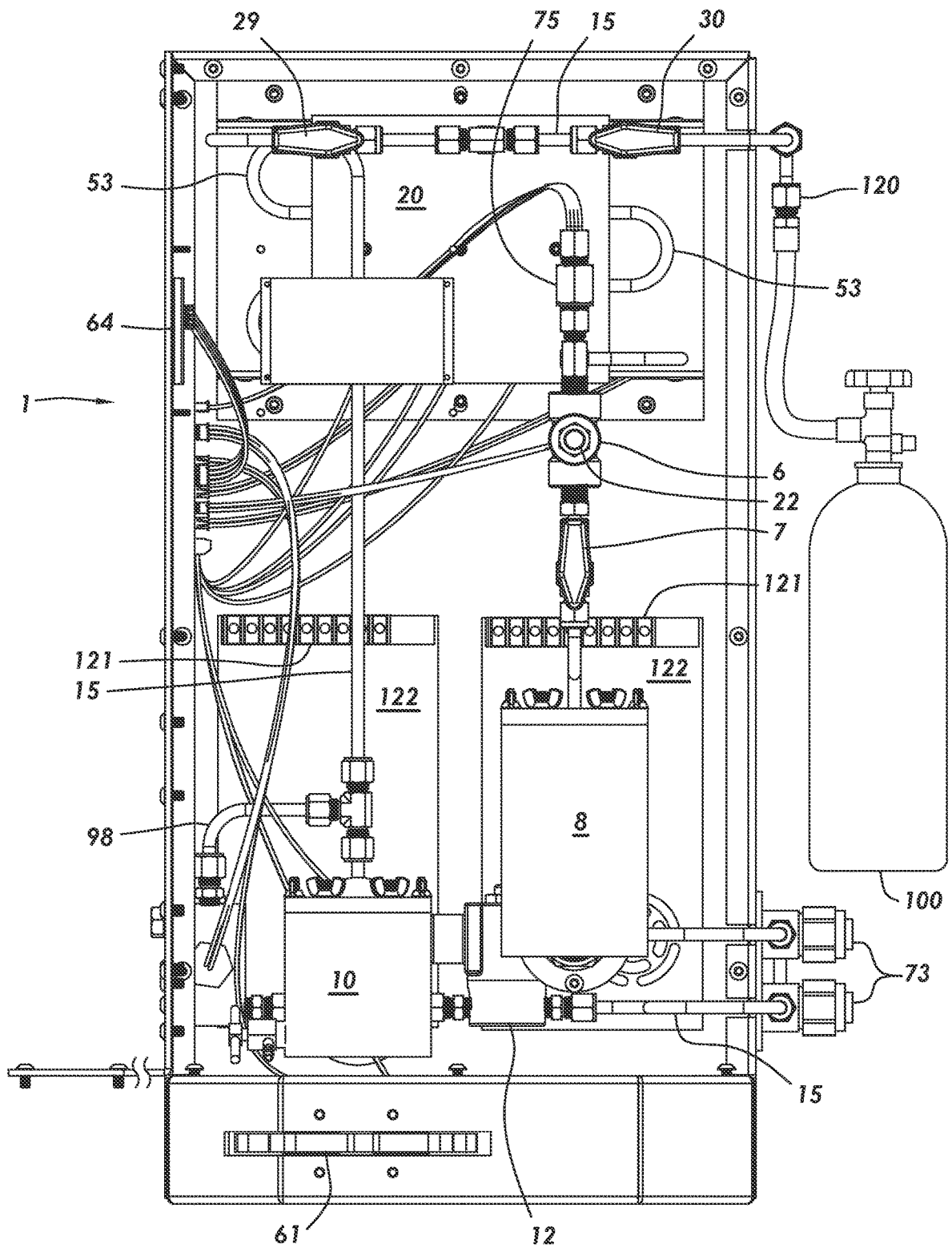
FIG. 4 is a front view of an embodiment of the inventive technology with front door open (at 90° angle).
Figure 7:
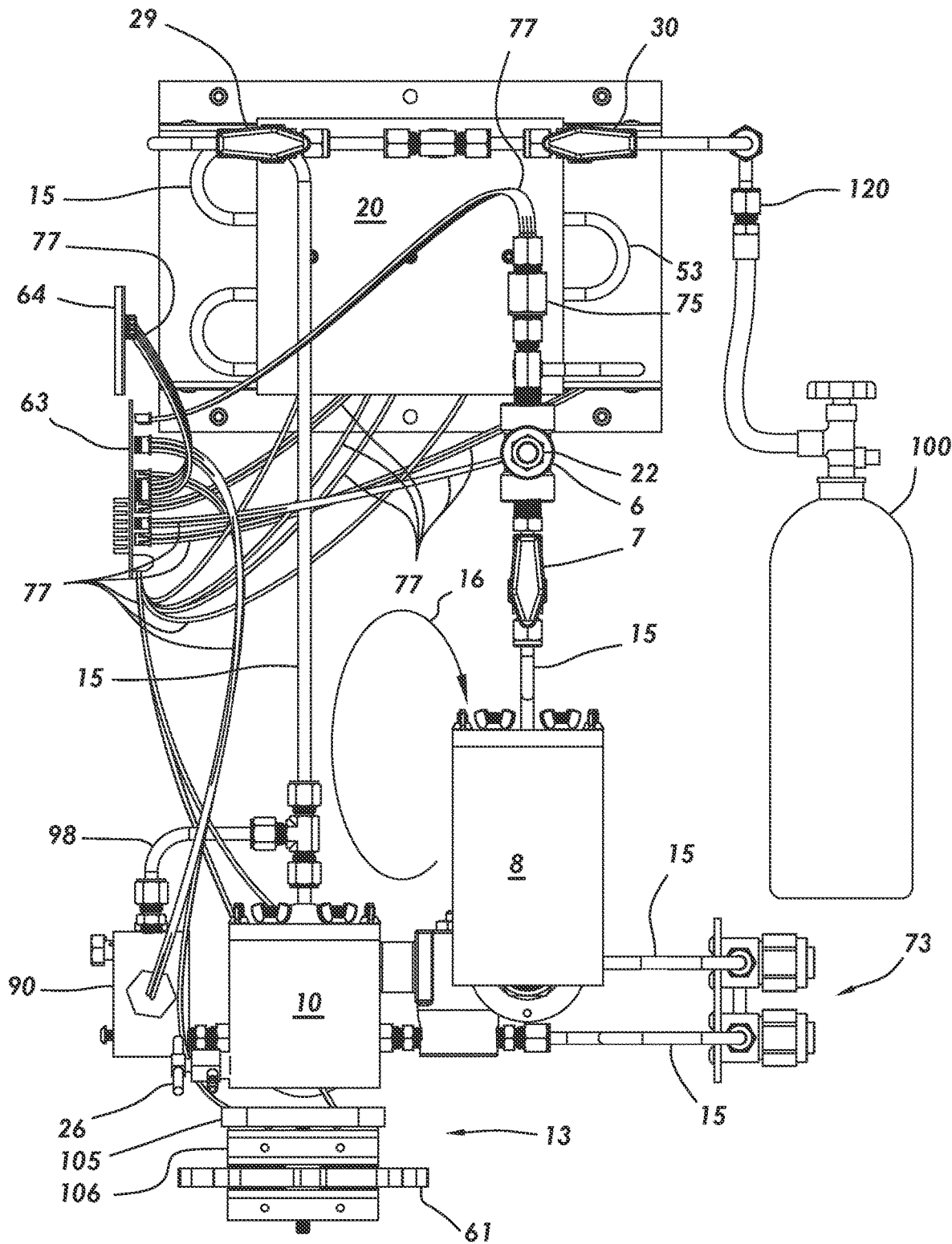
FIG. 7 is a front view of an embodiment of the inventive technology without certain componentry, e.g., paneling, apparatus base, rear chassis assembly, and internal power supply.

Referring primarily to FIGS. 1, 4 and 7, embodiments of the inventive technology may feature a carbon dioxide source that is external of a loop (but fluidically coupled therewith during at least some period of time of operation of the apparatus), and therefore referred to as a loop-external carbon dioxide source (100). That source may be, e.g., a pressurized tank of gaseous or even liquid carbon dioxide, or an "un-tanked" source of pressurized carbon dioxide, as but a few examples. A carbon dioxide source inlet flow valve (30) may be established, perhaps in-line of fluid conveyance componentry (15) that is configured to fluidically couple the loop-external carbon dioxide source (100) with the closed loop (16) (via carbon dioxide source inlet conveyance componentry (120), e.g., conduit and fittings, perhaps including a three-way fitting such as a T-fitting); that valve may be operable to control flow of carbon dioxide from the loop-external carbon dioxide source (100) into the closed loop (16).

Referring primarily to FIGS. 1, 4 and 7, note that, perhaps depending on the success of any apparatus purge or venting, it may be the case that there is air or additional gas other than gaseous carbon dioxide in the apparatus (and there may be water or liquid other than liquid carbon dioxide and liquid extract in the apparatus); such impurity does not change the fact that, e.g., the conveyance componentry is understood to convey carbon dioxide (liquid or gas) or liquid carbon dioxide-liquid extract mixture, or that various other componentry (e.g., carbon dioxide chiller (20), extraction chamber (8), extract collection chamber (10), heater (13), etc.) achieve their functionality by, e.g., acting on liquid or gaseous carbon dioxide. In roughly analogous fashion, the presence of an additional extractant, including but not limited to ethanol, admixed or dissolved with carbon dioxide (or even the presence of a non-extractant admixed with the carbon dioxide), such that the chiller (20) perhaps chills more than simply carbon dioxide, or the liquid carbon dioxide-liquid extract mixture includes an additional liquid component, does not mean that such labels or names are misdescriptive or no longer apply.

Referring primarily to FIGS. 1, 4 and 7, the apparatus may be configured via, e.g., injector, additional loop-external extractant source, etc., for entrainment of an additional substance such as an additional extractant (e.g., ethanol) into the closed loop (16), perhaps to be admixed with, e.g., carbon dioxide, potentially enhancing, expediting, customizing and/or facilitating the extraction/production process. In certain applications, a second extractant or other substance can be simply added to the plant biomass (3) before processing. Non-extractant substances that may somehow be entrained into the extractant (to, e.g., somehow amend the extract or the extraction process), whether via injection into the carbon dioxide, or dosing of the matrix, may include but are not limited to terpenes, MCT oil, vegetable oil, olive oil and/or coconut oil.

Relatedly, it should be understood that the inventive technology, while perhaps focusing on carbon dioxide as a sole or "primary" extractant (again perhaps with other "secondary" extractant(s)), is not so limited, as indeed embodiments of the inventive technology could potentially use any of a variety of extractants (whether purely one substance, a combination of more than one such substances, and even extractants with non-extractant materials admixed). Accordingly, embodiments of the inventive technology may be generally described as including, e.g., an extractant chiller (4), a loop-external extractant source, etc., with a closed loop (16) through which an extractant, liquid extractant, gaseous extractant and/or liquid extractant-liquid extract mixture is moved.

Now referring primarily to FIGS. 4, 6, 7, 8, 18A-B and 19A-F, embodiments of the inventive technology may feature a chiller (4), broadly referring to any system that can generate a cooling effect that, when configured in and as part of the inventive apparatus, can cause a transfer of heat from carbon dioxide (or other extractant) passing through it to achieve the desired phase change from gas to liquid. Examples in include, e.g., an enclosed refrigerator, evaporative cooling unit, thermoelectric chiller (20) (also known as a Peltier chiller), etc. Note that while discussion of a particular embodiment(s), perhaps shown in the figures, references thermoelectric chiller (20), it should be understood that many different other types of chiller (4) could be used instead, and the inventive technology should be understood as encompassing more than simply a thermoelectric chiller (20).

Again referring primarily to FIGS. 4, 6, 7, 8, 18A-B and 19A-F, in embodiments featuring a thermoelectric carbon dioxide chiller (20), such chiller may comprise at least one thermoelectric chiller module (59) (including but not limited to what may perhaps known conventionally as a thermoelectric cooler module (59) (TEC module)). Such module (59) may feature, e.g., a semiconductor matrix sandwiched between two conductive sheets that is further sandwiched between thermally conductive plates (e.g., ceramic wafers); broadly, a TEC module (59) may be any thermoelectrically chilling assembly or contiguity that, during operation, is colder on one side, face or portion, and warmer on the other, due to the Peltier effect. Fluid conveyance componentry (15) (e.g., fluid conduit) may be winding conduit (53) that moves carbon dioxide flowing in it via pressure differential and/or gravity so that the thermoelectric chiller module(s) (59) chills the gaseous carbon dioxide sufficiently (lowers its temperature enough) to change its phase from gas to liquid. In certain embodiments, the chiller may output a super chilled liquid (at any of a variety of pressures, including but not limited to about 500 psi).

Referring primarily to FIGS. 19A-F, winding conduit (53) may, of course, be established sufficiently close to the cold side of the module(s) (59) to chill (via heat exchange) the carbon dioxide to change its phase. A chiller plate(s) (54) (perhaps of highly thermally conductive material) may be placed against a side of the winding conduit (53) (particularly where such conduit is established substantially in one plane), or even, where two plates are used, sandwich such conduit. In order to enhance and/or focus the chilling effect of the thermoelectric chiller module(s) (59), a least one piece of insulation (e.g., sheet foam (57)) may be established to lower the extent of heat transfer to the module(s) (59) from anything other than the conduit passing through the chiller (20). A spacer plate (51) may be used to, e.g., help to properly seat and position chiller components. A heat sink (55) may be configured to absorb heat from the thermoelectric chiller module(s) (59) (one side of each module (59) is warmer than the other), and at least one fan (56) (e.g., spinning impeller type) may be configured to transfer heat away from the heat sink (55) via forced conduction. Of course, a power source may be electrically connected to power the chiller (20) (including its module(s) (59) and any fans (56) that may exist). Note that a carbon dioxide chiller (20) may be said to be fluidically coupled with the loop-external carbon dioxide source (100) to receive carbon dioxide therefrom even though carbon dioxide may be conveyed from the loop-external carbon dioxide source (100) to the chiller (20) only during initial stages of the operation of the apparatus (at which time closed loop flow might not have commenced).

Referring primarily to FIGS. 4, 6, 7, 8, 18A-B and 19A-F, it is of note that certain aspects of the inventive technology may relate broadly to the use of a thermoelectric chiller (20) in a plant biomass extraction apparatus (1) that includes processing componentry configured to produce a liquid extract from plant biomass (3) using carbon dioxide, where such processing componentry includes extraction componentry (including but not limited to the extraction chamber (s) (8) disclosed herein), an extract collection componentry (including but not limited to the extract collection chamber (s) (10) disclosed herein), and fluid conveyance componentry (15) that fluidically couples the extraction componentry with the extract collection componentry and the thermoelectric chiller (20). Such chiller (20) may include at least one thermoelectric chiller module (59) and may be configured to chill gaseous carbon dioxide (via, e.g., its physical proximity to conduit through which carbon dioxide passes) to change it to liquid carbon dioxide. Certain of such inventive embodiments may feature a closed loop (16) defined by the processing componentry and the fluid conveyance componentry (15), and even a loop-external carbon dioxide source (100) that is established externally of the closed loop (16), where fluid conveyance componentry (15) fluidically couples not only the aforementioned processing componentry, but also fluidically couples the loop-external carbon dioxide source (100) with the chiller (20). Certain embodiments may broadly be described as a plant biomass extraction apparatus (1) that achieves closed loop processing (perhaps even passive, pump-free closed loop processing), and chills extractant via a thermoelectric chiller (20). Certain embodiments may feature a refrigerant-free chiller in a closed loop extraction apparatus. It is of note, incidentally, that the term componentry should be broadly understood to include one or more component(s), each of which itself may have one or more part(s)), and that a reference to different types of components or componentry does not necessarily imply the absence of shared parts or structures, or the absence of any overlap among such components or componentry. Indeed, as an example, first componentry might (but need not necessarily) feature part(s) that are shared by second componentry.

Referring primarily to FIGS. 3, 4, 6, 12A and 12B, a fluid metering reservoir (6) may be used to facilitate and perhaps even enable reasonably proper and accurate charging of the closed loop (16) with sufficient carbon dioxide for operation. Such reservoir may appear in various locations, e.g., between the chiller (20) and the extraction chamber (8), or between the extraction chamber (8) and the extract collection chamber inlet flow valve (12). Its level may, at least in part, be controlled by a metering reservoir valve (7) downflow of it (e.g., immediately downflow of it). The reservoir and its associated valve may allow for retention of liquid carbon dioxide output from the chiller (20), when that valve is closed. Particularly during charging of the apparatus, that valve may be intentionally closed, and carbon dioxide output directly from the tank into the loop (and then having passed through the chiller (20) and phase changed to liquid) may accumulate in the reservoir. Visible inspection of a level of liquid fluid (e.g., liquid carbon dioxide or other liquid extractant) in that reservoir may enable an operator to manually open the valve when the upper surface of that accumulated liquid reaches a certain level. Such visible inspection may be facilitated by a light (23) (e.g., a LED light) positioned to shine through the reservoir and outwardly, through a viewing port (22). There may instead be provided an automatic metering reservoir valve (7) and fluid metering reservoir (6) quantity sensor to automatically open a closed valve when appropriate (of course a controller (63) may play a role in operation of such valve based on sensed quantity). Upon opening that valve (which may be left open for the remainder of the operation unless an additional one or more charging steps is necessary to fully charge the closed loop (16) with sufficient amount of carbon dioxide), then a loop flow termination valve (29) may also be opened (if indeed it is closed), perhaps initiating the operation of closed loop flow.

It is of note that where the fluid metering reservoir (6) (and a valve that controls its retention of liquid) is located between the extraction chamber (8) and any extract collection chamber inlet flow valve (12) that may be present, the fluid retained in the valve may be generally described as a liquid carbon dioxide-liquid extract mixture (when that reservoir and valve is between the chiller (20) and the extraction chamber (8), the retained fluid may be simply a liquid carbon dioxide). Additionally, it should be understood that even where liquid is not retained in the fluid metering reservoir (6) (where its valve is left open, e.g., as during closed looped flow), and merely passes through it, liquid carbon dioxide is still said to pass from that reservoir, and downflow componentry may be said to receive fluid from the reservoir.

Figure 12A:
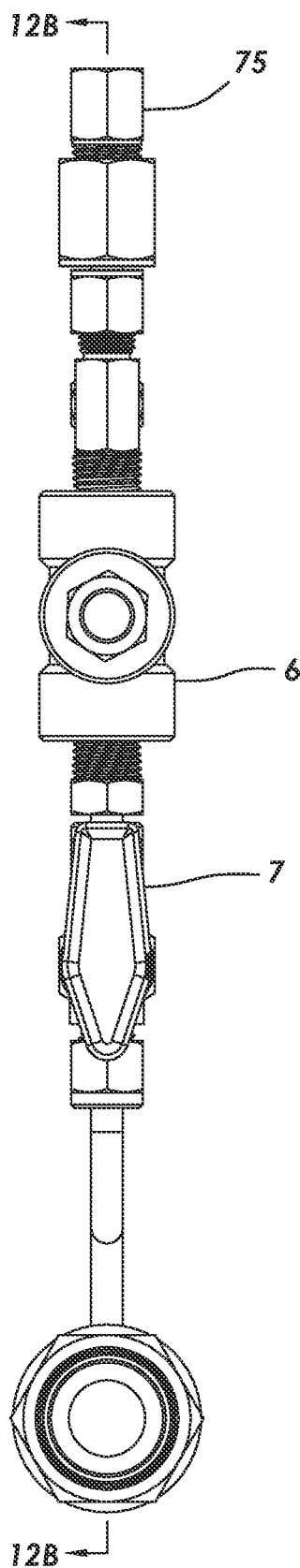
FIG. 12A is a front view of a portion of the apparatus that includes the fluid metering reservoir and the metering reservoir valve, as appears in an embodiment of the inventive technology.
Figure 12B:
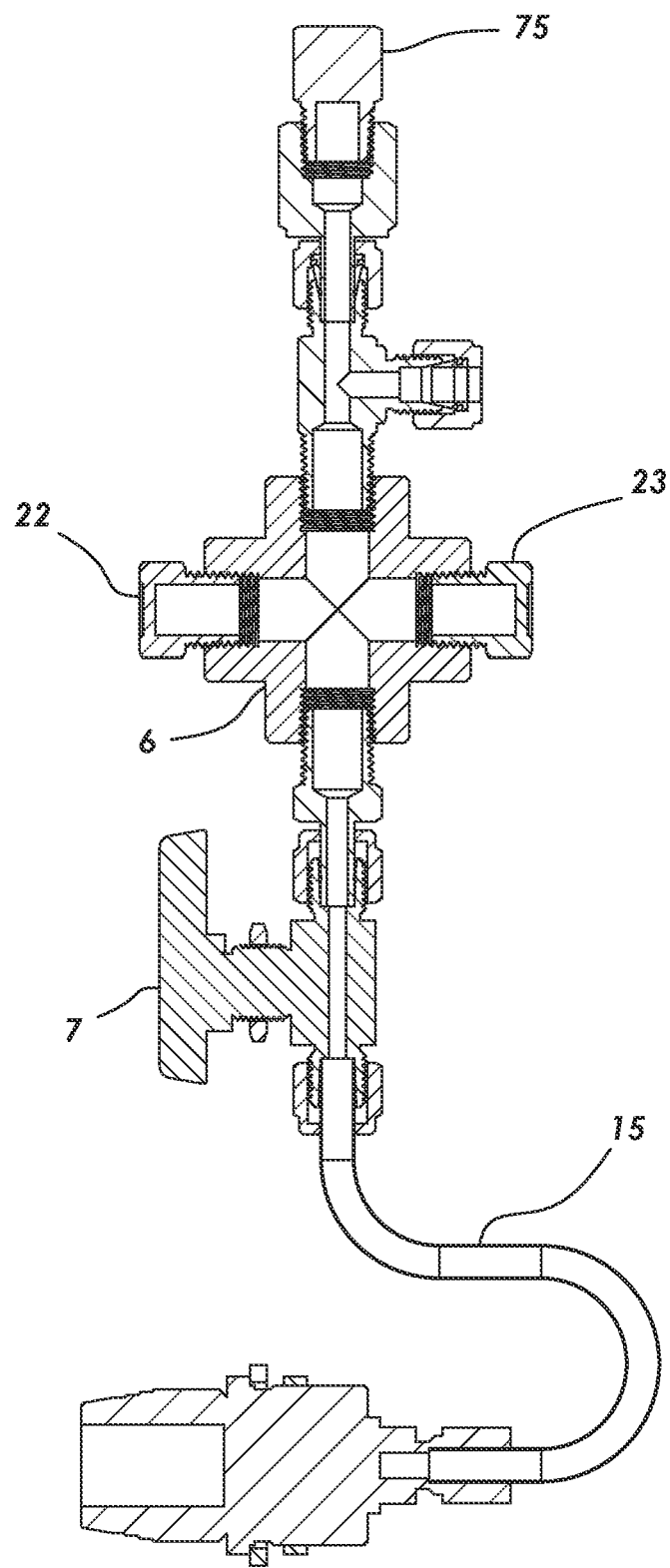
FIG. 12B is a right cross-sectional view (Section 12B-12B) of a portion of the apparatus that includes the fluid metering reservoir and the metering reservoir valve, as appears in an embodiment of the inventive technology.
Figure 13B:
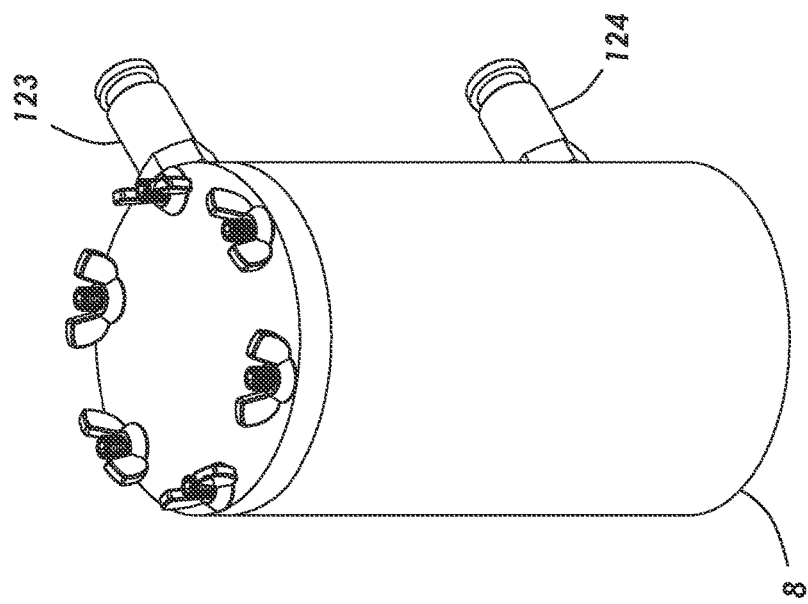
FIG. 13B is a front right aerial perspective view, of an extraction chamber as appears in an embodiment of the inventive technology.
Figure 13A:
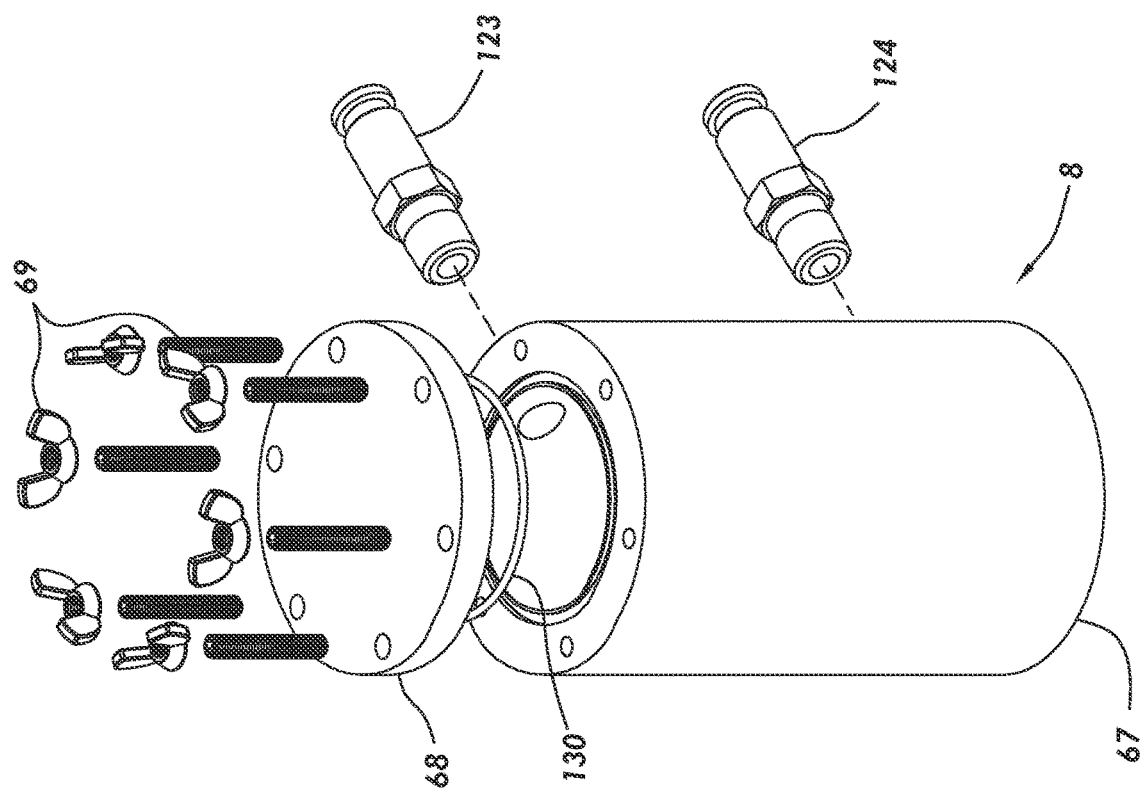
FIG. 13A is an exploded, front right aerial perspective view of an extraction chamber as appears in an embodiment of the inventive technology.
Figure 14A:
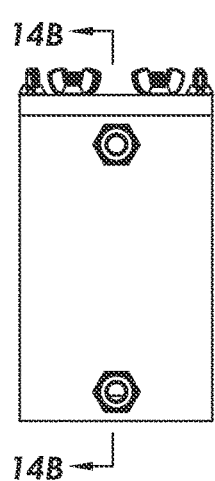
FIG. 14A shows a rear view of an extraction chamber as appears in an embodiment of the inventive technology.
Figure 14B:
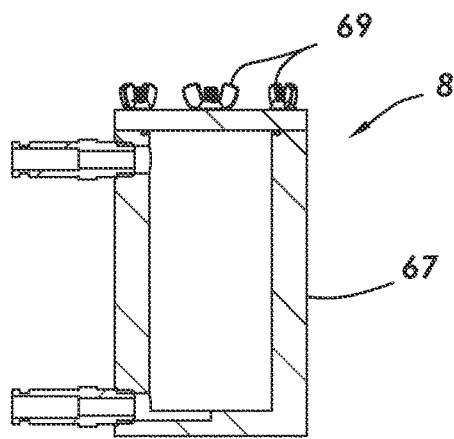
FIG. 14B shows a left side cross-sectional view (Section 14B-14B) of an extraction chamber as appears in an embodiment of the inventive technology.
Figure 14C:
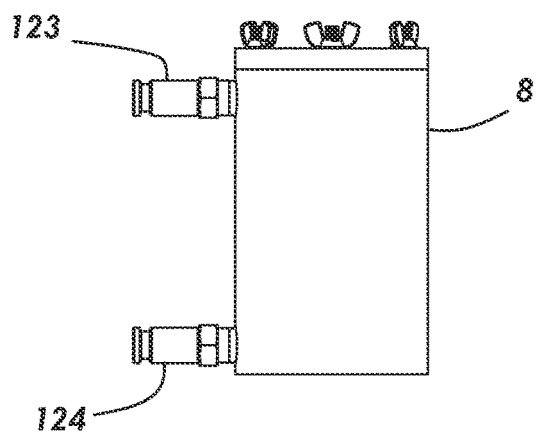
FIG. 14C shows a left side view of an extraction chamber as appears in an embodiment of the inventive technology.
Figure 14D:
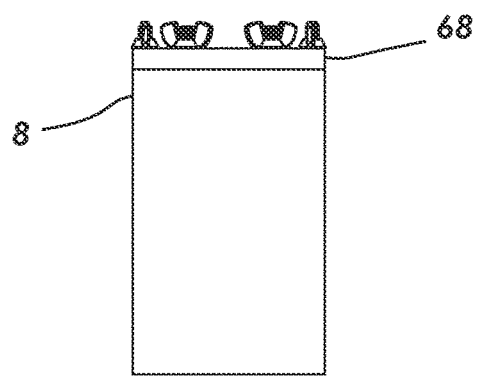
FIG. 14D shows a front view of an extraction chamber as appears in an embodiment of the inventive technology.
Figure 14E:
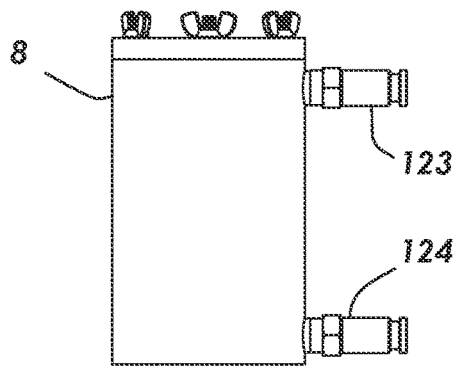
FIG. 14E shows a right side view of an extraction chamber as appears in an embodiment of the inventive technology.
Figure 14F:
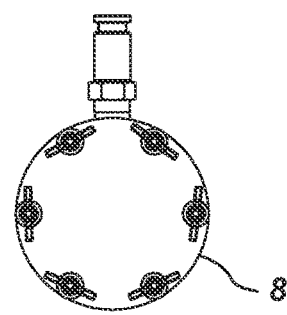
FIG. 14F shows a top plan view of an extraction chamber as appears in an embodiment of the inventive technology.
Figure 15C:
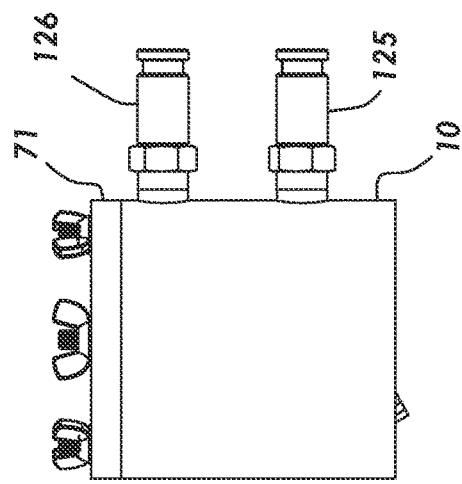
FIG. 15C shows a right side view of an extract collection chamber as appears in an embodiment of the inventive technology.
Figure 15E:
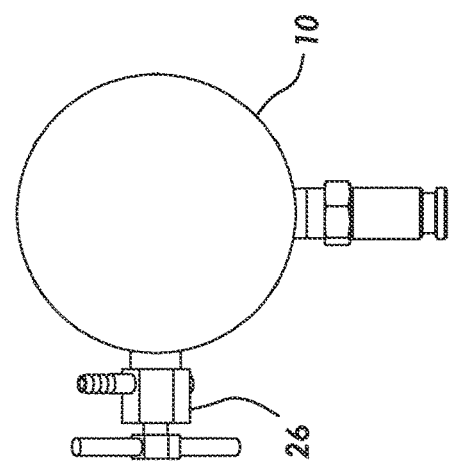
FIG. 15E shows a bottom view of an extract collection chamber as appears in an embodiment of the inventive technology.
Figure 15B:
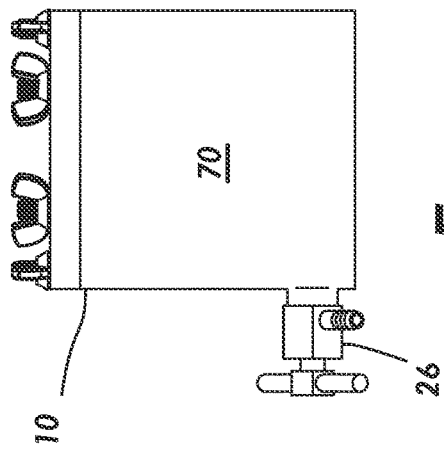
FIG. 15B shows a front view of an extract collection chamber as appears in an embodiment of the inventive technology.
Figure 15D:
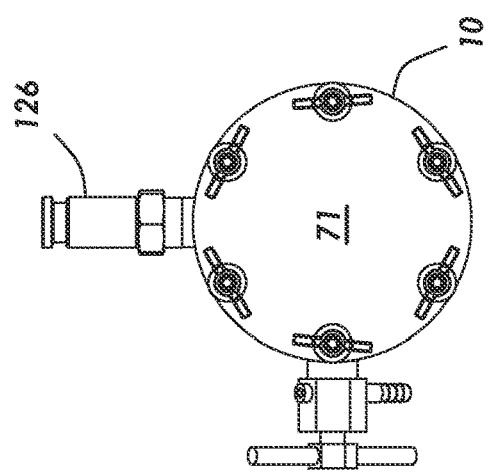
FIG. 15D shows a top view of an extract collection chamber as appears in an embodiment of the inventive technology.
Figure 15A:
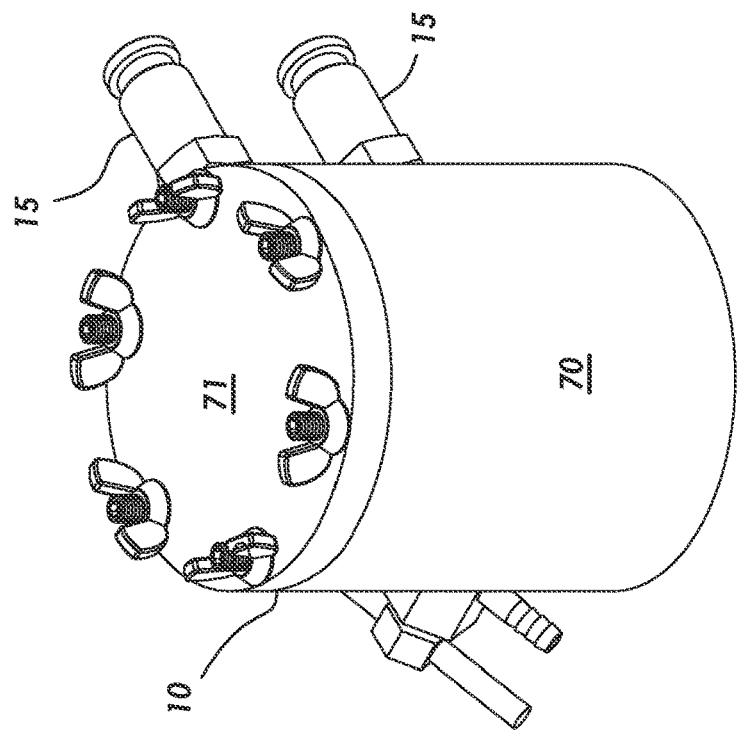
FIG. 15A shows a front right aerial perspective view of an extract collection chamber as appears in an embodiment of the inventive technology.
Figure 17A:
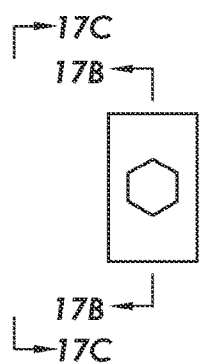
FIG. 17A shows a front view (to orient viewer with respect to enlarged FIGS. 17B-17D) of a discrete sensor sub-assembly as appears in an embodiment of the inventive technology.
Figure 17B:
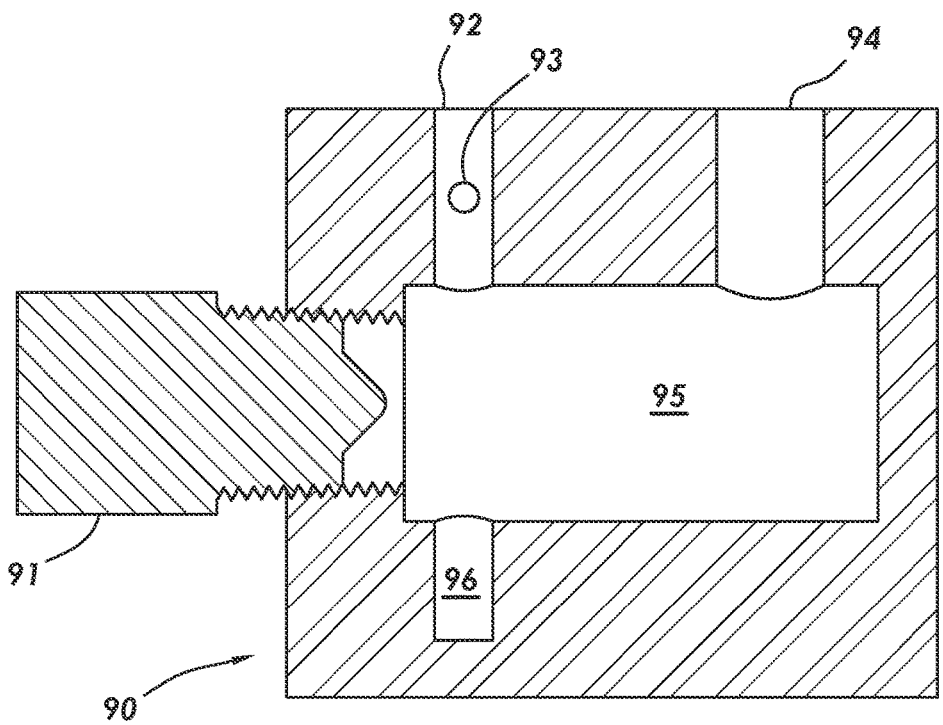
FIG. 17B shows a right side cross-sectional view (Section 17B-17B) of a discrete sensor sub-assembly as appears in an embodiment of the inventive technology.
Figure 17C:
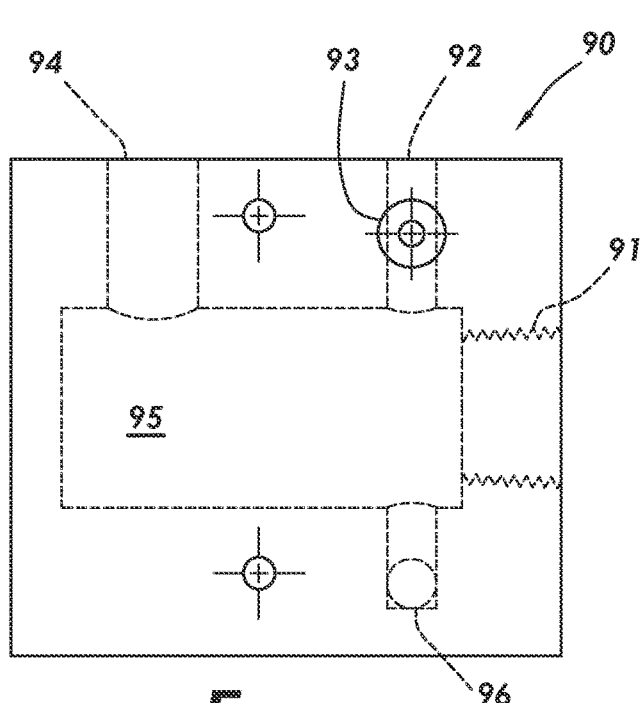
FIG. 17C shows a left side cross-sectional view (Section 17C-17C), without showing the sensor, of a discrete sensor sub-assembly as appears in an embodiment of the inventive technology.
Figure 17D:
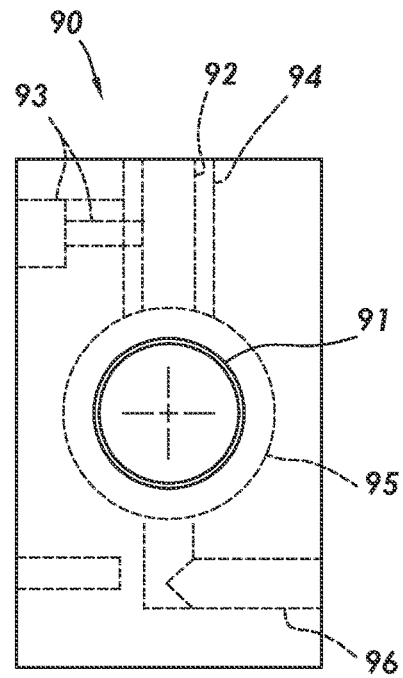
FIG. 17D shows a front cross-sectional view (at a vertical section that is orthogonal to Section 17B-17B and 17C-17C) of a discrete sensor sub-assembly as appears in an embodiment of the inventive technology.
Figure 18A:
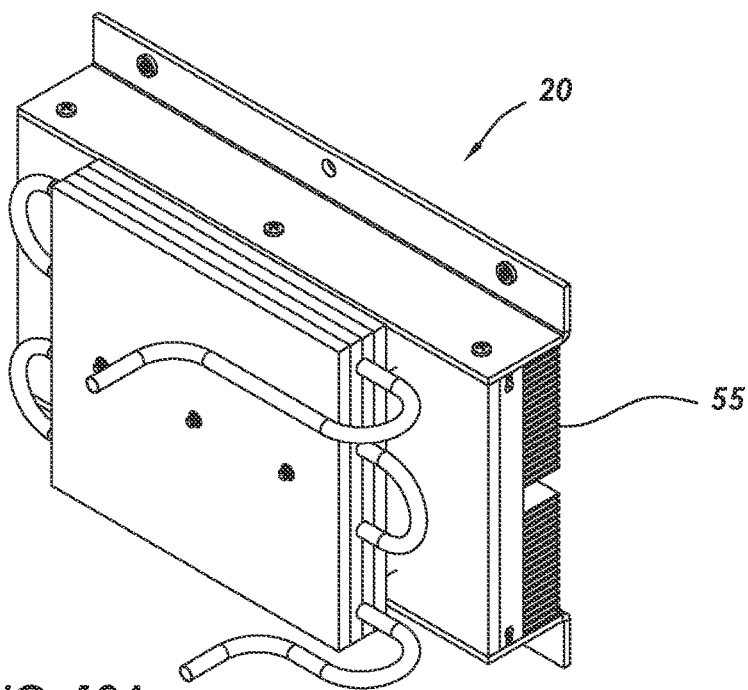
FIG. 18A shows a front right aerial perspective view of a thermoelectric chiller as appears in an embodiment of the inventive technology.
Figure 18B:
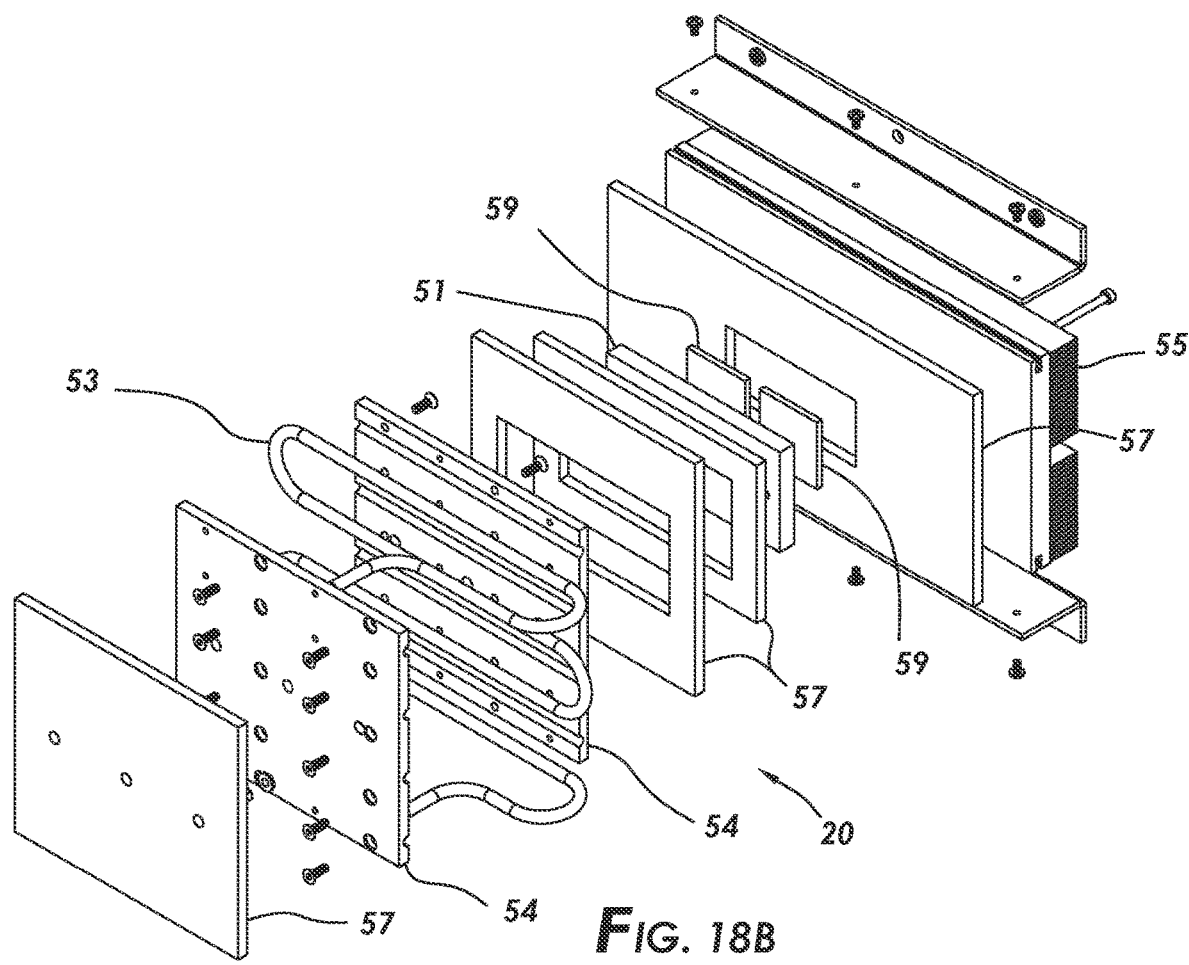
FIG. 18B shows an exploded front right aerial perspective view of a thermoelectric chiller as appears in an embodiment of the inventive technology.
Figure 19A:
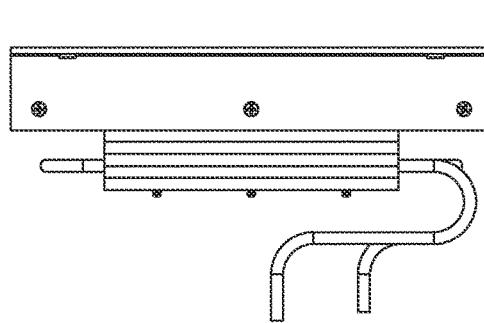
FIG. 19A shows a top view of a thermoelectric chiller as appears in an embodiment of the inventive technology.
Figure 19B:
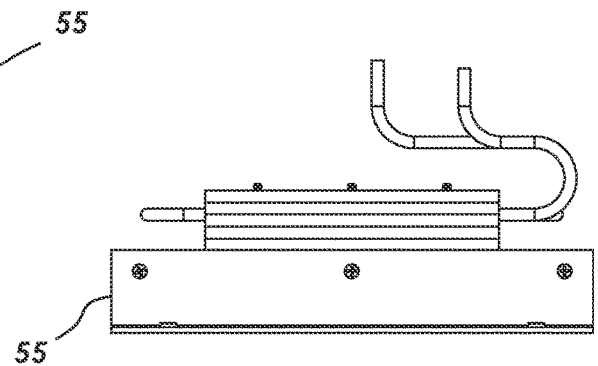
FIG. 19B shows a bottom view of a thermoelectric chiller as appears in an embodiment of the inventive technology.
Figure 19C:
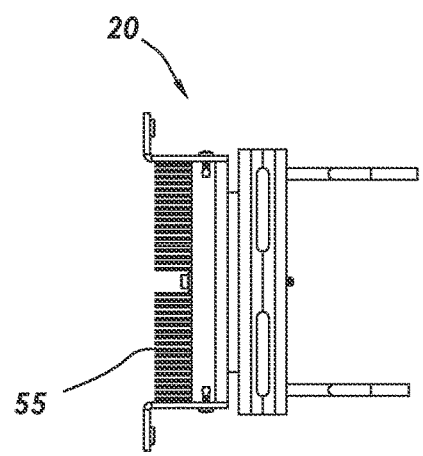
FIG. 19C shows a left side view of a thermoelectric chiller as appears in an embodiment of the inventive technology.
Figure 19D:
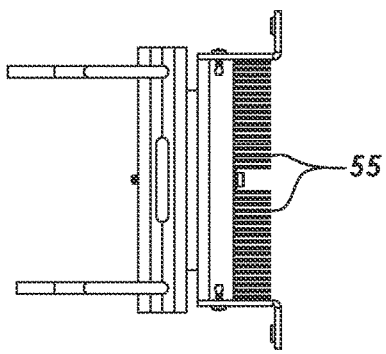
FIG. 19D shows a right side view of a thermoelectric chiller as appears in an embodiment of the inventive technology.
Figure 19E:
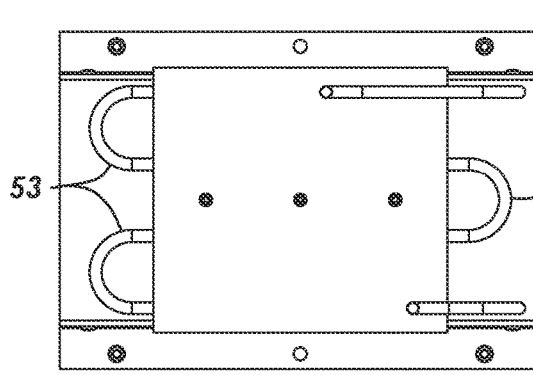
FIG. 19E shows a front view of a thermoelectric chiller as appears in an embodiment of the inventive technology.
Figure 19F:
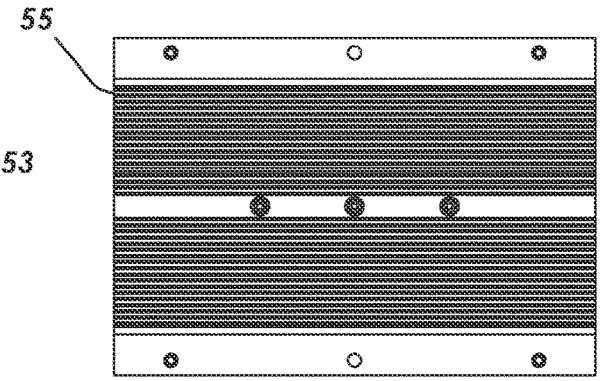
FIG. 19F shows a rear view of a thermoelectric chiller as appears in an embodiment of the inventive technology.

Referring primarily to FIGS. 12A and 12B, the fluid metering reservoir (6) could be a chamber, which itself is a broad term that includes virtually any size, cross-sectional shape (where that cross-section is orthogonal to a longitudinal axis of the chamber) such as but not limited to circular, square, triangular, polygonal, hexagonal, elliptical, curved, rectangular, combinations thereof, etc.), perhaps with inlet and outlet; the reservoir could include or even be (in its entirety), e.g., a portion of conduit and/or fittings that is/are directly upflow of a metering reservoir valve (7).

Embodiments could provide an automatic metering reservoir valve assembly that includes an automatic valve (e.g., with a valve positioner such as a servo-actuator) and a sensor that senses liquid quantity in the metering reservoir (e.g., liquid level sensor). When the sensor senses a certain quantity (e.g., a predetermined quantity as indicated by, e.g., a liquid level), then the valve may automatically open. Of course, as with any automatic valve (or other automatic functionality, such as but not limited to termination, start or adjustment of heating or chilling upon sensing of a certain temperatures), such automated functionality may be achieved, at least in part, via a controller (63). Referring primarily to FIGS. 3, 4, 6, 12A and 12B, it is of note that, regardless of whether the valve is automatic or manual (e.g., a ball valve, as but one of many possible examples), certain embodiments may feature a pressure sensor (75) configured within or upflow (perhaps immediately upflow) of the reservoir. Such pressure may provide a substantially representative value of pressure within the entire closed loop.

Referring primarily to FIGS. 3, 4, 6, 13A-B, and 14A-E, certain embodiments of the inventive technology may feature an extraction chamber (8). Such extraction chamber (8) may contain the plant biomass (3) from which the extract is removed (a user may place that biomass in that chamber). The liquid carbon dioxide may pass into such chamber, engage such plant biomass (3) via physical contact, and remove an extract therefrom (via the known effect of liquid carbon dioxide to dissolve certain plant biomass (3) components), producing and outputting a liquid carbon dioxide-liquid extract mixture (often that mixture may be a solution (of extract and extractant); at times the mixture may contain other non-extract particulates that may be removed therefrom via a filter, and/or may include some amount of other non-extract material). Generally, the liquid carbon dioxide-liquid extract mixture is a mixture (a general term that includes but is not limited to a solution) of liquid carbon dioxide and extract. It may often, but need not, present as a solution of liquid carbon dioxide and liquid extract, and even when it includes other plant substances such as particulates that are not necessarily dissolved in the mixture, it may still be referred to as a liquid carbon dioxide-liquid extract solution). As with any chamber, it may include a chamber body (67) that has an inner (and outer surface), where such chamber body may be made up of different components (e.g., lid (68) fastened onto cylinder body with one end open with mechanical fasteners (69); two ends fastened to an open-ended cylinder with mechanical fasteners, perhaps either using intervening seals such as gasket(s) (130), as but a few examples). Of course, there may be provided inlet and outlet fittings (123, 124).

Referring primarily to FIGS. 3, 4, 6, 15A-E and 16A-B, the extract collection chamber (10) may provide an enclosed site for production of liquid extract from the liquid carbon dioxide-liquid extract mixture. Such may be achieved by heating of the mixture in the extract collection chamber (10) so as to change the phase of the liquid carbon dioxide of the mixture to gas, leaving the liquid extract in the extract collection chamber (10). Newly converted gaseous liquid carbon dioxide may then be expelled from the chamber via fluid conveyance componentry (15) (e.g., gaseous carbon dioxide conveyance componentry) that then conveys that gas to the chiller (20). Note that in certain embodiments, part of that fluid conveyance componentry (15) may also be used to convey gas from where gas (or liquid) carbon dioxide from a carbon dioxide source (e.g., tank) may enter the loop (e.g., at a T-fitting) to the chiller (20). Such phase conversion (from liquid to gas) increases pressure (due to volumetric expansion during liquid to gas phase change), which can force the gas from the extract collection chamber (10) to the chiller (20) (perhaps against gravity during at least part of such conveyance). Where necessary to effect such phase change, a heater (13) may be used to heat the liquid mixture in the extract collection chamber (10); in certain embodiments, that heater (13) may be controlled by a controller (63), perhaps to provide that amount of heat (or heat transfer rate) to achieve a certain performance target (e.g., temperature of liquid mixture in the chamber, as but one example).

Referring primarily to FIGS. 15A-E and 16A-B, certain embodiments may present liquid extract removal componentry (24) configured to enable delivery of the liquid extract from the extract collection chamber (10). Such componentry may include a groove (25) on a bottom inner surface of the extract collection chamber (10) for flow of liquid extract out of the chamber (the groove (25) perhaps sloped downward to provide for gravity flow of the liquid extract that has collected at the bottom of that chamber), perhaps in addition to a liquid extract delivery valve (26) (whether manually operated or not) that enables for controlled delivery of liquid extract to outside of the extract collection chamber (10). Certain embodiments may be described as featuring a valved drain or valved drain spout configured to enable draining of collected liquid extract from the extract collection chamber (10).

Referring primarily to FIGS. 15A-E and 16A-B, as with any chamber, the extract collection chamber (10) may include a chamber body (70) that has an inner (and outer surface), where such chamber body (70) may be unitary, or may indeed be made up of different components (e.g., lid (71) fastened onto cylinder body with one end open with mechanical fasteners (72); two ends fastened to an open-ended cylinder with mechanical fasteners, perhaps using intervening seals such as gaskets, as but a few examples). Of course, there may be provided inlet and outlet fittings (125, 126), in addition to the aforementioned liquid extract removal componentry (24).

Referring primarily to FIGS. 6-10, a heater (13) may be configured to transfer heat to the extract collection chamber (10). That heater (13) may be, e.g., electric heater (13) such as including electric heater plate (105), natural gas heater (13), propane heater (13) and/or induction heater (13), as but a few examples. A heater (13) is not a necessary feature of the inventive technology, as indeed, in certain applications, the apparatus can achieve the conversion of liquid carbon dioxide to gaseous carbon dioxide by room temperature or other ambient temperature, under pressures allowing such. Such particularized embodiments may merely enable for adequate transfer of heat from the ambient environment (e.g., surrounding air) to the extract collection chamber (10) and the liquid mixture in it. Embodiments of the inventive technology may broadly be said to feature an extract collection chamber (10) that is configured for heat transfer to a liquid carbon dioxide-liquid extract mixture therein (whether via a heater (13) or simply exposure to ambient conditions (e.g., room temperature)) sufficient to vaporize the liquid carbon dioxide of such mixture, but not the liquid extract of such mixture.

Referring primarily to FIGS. 6-10, it is of note that in certain applications, the heater (13) may be used to achieve intentionally low temperatures of the mixture in the extract collection chamber (10) (i.e., lower than the highest temperature that is below the vaporization temperature of the extract) in order to, e.g., avoid a spoiling of the extract that may result in the use of such maximum possible temperature. Indeed, looped flow may be used, at least in certain applications, because looped flow enables the repeatedly re-freshed extractant (repeatedly regenerated by the extract collection chamber (10)) to repeatedly engage the plant biomass (3) (to repeatedly remove even more extract therefrom during successive flow loops), thereby removing high amounts of extract, even though temperatures may be lower, intentionally or otherwise, than those high temperatures that would otherwise effect a quick vaporization of liquid carbon dioxide in the extract collection chamber (10). The aforementioned use of lower temperatures, while perhaps resulting in longer process completion times than possible, may achieve processing that is more selective to desired extracts (or extract components) such as flavonoids and/or turpenoids, while being less selective to (perhaps even avoiding extraction of) substances that may be undesired in a produced extract, e.g., waxes and lipids. By avoiding dissolution of such less desired substances, embodiments of the inventive technology may obviate the need for additional processing of a produced extract in order to remove them. The lower temperature and/or lower pressure processing achieved by embodiments of the inventive technology, perhaps resulting in sub-critical extractant conditions, may thereby achieve what may be referred to as a gentler production process, to achieve higher quality, more refined product than known apparatus using significantly higher temperatures and/or pressures.

Referring primarily to FIGS. 6-10, certain embodiments of the inventive technology may include an electric heater (13) that itself includes, e.g., a heater plate (105) and a heater bracket (106) (and that is of course configured to receive power). There may be provided a (manually adjustable) height adjustment knob (61) that enables the vertical repositioning of the heater plate (105), perhaps providing an additional manner (in addition to, e.g., electrically adjusting the heater (13)) to adjust the heat transferred to the liquid mixture in the extract collection chamber (10) (by changing the degree of any surface-to-surface contact between the heater (13) and the extract collection chamber (10), or the closeness of such surfaces). The height adjustment knob (61) may also (or instead) facilitate the attachment and/or detachment of the extract collection chamber (10).

Referring primarily to FIGS. 6-10, certain embodiments may feature controller regulation of heat applied to fluid in the extract collection chamber (10) to provide a degree of automated control. Such functionality may be achieved, at least in part, via a temperature sensor and cabling configured to transfer sensed readings to the controller (63). The controller (63) may, upon comparing sensed value(s) to a temperature target (perhaps stored in memory), then issue instructions to the heater (13) if a target is missed. Such instructions may be used by certain componentry, e.g., an automated heater (13) switch or rheostat, as but two examples, to increase or decrease the heat applied by either turning the heater (13) on or off, or changing the heat output by the heater (13) while leaving it on. Certain embodiments may feature automatic powering-on of any one or more of such components, and/or perhaps be configured for operator control via an interface (e.g., providing for interface enabled powering on, off, or control).

Referring primarily to FIGS. 1, 2A-D, 4, 5A and 6, certain embodiments may feature a manually operable controls (e.g., switch(es), dials, knobs, etc.) to turn off or on or one or more of the following: heater (13), liquid quantity sensor (91) (e.g., to sense, directly or indirectly, the amount of liquid carbon dioxide-liquid extract mixture in the extract collection chamber (10)), chiller (20), and/or an automatic extract collection chamber inlet flow valve (12), and/or to adjust such components (e.g., adjust the heat output by a heater (13)). Various embodiments of such inventive technology may feature an indicator light (e.g., a component power-on light, or sensor light) to show, e.g., whether the heater (13) is on or not.

Referring primarily to FIGS. 6-8 and 17A-D, certain embodiments of the inventive technology may feature an extract collection chamber inlet flow valve (12) to control flow of the liquid carbon dioxide-liquid extract mixture into the extract collection chamber (10) in response to the quantity of the liquid carbon dioxide-liquid extract mixture in the extract collection chamber (10) as sensed by a liquid quantity sensor (91), e.g., a liquid level sensor. Essentially, the extract collection chamber inlet flow valve (12) may be open when the sensed quantity is below a certain value (e.g., liquid level below a certain height), but closed when that sensed quantity is at or above that certain value. The sensed quantity can be, e.g., sensed mass (e.g., sensed weight) or sensed volume (e.g., sensed liquid level (height)). Note that the liquid quantity sensor (91) and the extract collection chamber inlet flow valve may be at least part of an assembly referred to as an automatic extract collection chamber inlet flow valve and sensor assembly; in certain embodiments that assembly may include an automatic valve (12), a discrete sensor sub-assembly (90), and fluid conveyance componentry (15) therebetween. As with any liquid quantity sensor (91) that may find use in the inventive technology, one type of such sensor can be a liquid level sensor such as an electro-optic level switch, possibly featuring a prismatic lens, LED light, transmitter and/or receiver.

Referring primarily to FIGS. 6-8 and 17A-D, sensing can be done directly by direct sensing of the quantity of the mixture in the extract collection chamber (10), or it can be indirect, via direct sensing of a quantity of liquid in a reservoir (95) (including but not limited to a small chamber and even vertical conduit) that is discrete from the extract collection chamber (10) but still fluidically coupled to the extract collection chamber (10). That reservoir (95) may be part of the aforementioned discrete sensor sub-assembly (90) that itself is part of an automatic extract collection chamber (10) valve and sensor assembly; the quantity of mixture in that discrete reservoir (95) may be related to the quantity of mixture in the extract collection chamber (10) (e.g., perhaps their levels are the same, because they are fluidically coupled). Such a discrete sub-assembly (90) can provide for a pressure sensor (94) and/or a pressure blow off valve (93) (e.g., a burst disc, in the event of clogging of, e.g., any conduit, ports or fittings), in addition to the fluid reservoir and a quantity sensor configured to sense quantity of fluid in such reservoir (95). Notably, in certain embodiments, there may also be pressure relief fluid conveyance componentry (15) (e.g., conduit, including a pressure relief port (92) that may extend from the discrete sensor sub-assembly (90) to join up with the fluid conveyance componentry (15) that extends from the extract collection chamber (10) (and travelling to the chiller (20)). Such pressure relief fluid conveyance componentry (98), in conjunction with the aforementioned split of the flow passing through the automatic extract collection inlet flow valve, may create a parallel coupling of the discrete sub-assembly (90) with the extract collection chamber (10). The pressure relief fluid conveyance componentry (98) may help to substantially avoid the creation of a vacuum in that sub-assembly (90) that might otherwise prevent the conveyance of gaseous carbon dioxide from the extract collection chamber (10) to the chiller (20).

Referring primarily to FIGS. 6-8 and 17A-D, in embodiments that feature such indirect sensing, the discrete sensor sub-assembly (90) may be directly fluidically coupled with, e.g., the extract collection chamber inlet flow valve (12) and the extract collection chamber (10) and/or the carbon dioxide chiller (20). In certain embodiments, flow from the extraction chamber (8) that passes through the extract collection chamber inlet flow valve (12) (when open of course) may then be conveyed to the extract collection chamber (10) and the discrete sensor sub-assembly (90) (e.g., via a T-fitting that splits such flow), and enter that chamber and the reservoir of the sub-assembly (90) (via its inlet/outlet port (96)), perhaps accumulating in each to identical levels (heights). The discrete sensor sub-assembly (90) (again, which itself may be able to contain an amount of the liquid mixture in its reservoir) may include a sensor (e.g., an electro-optic level switch) that senses a quantity of liquid carbon dioxide-liquid extract mixture in that sub-assembly (90) (such quantity (e.g., as indicated by its free surface level) may be related (perhaps even identical) to the quantity of mixture in the extract collection chamber (10)). When that directly sensed quantity (e.g., level of fluid in the sub-assembly (90)) is at or above a certain amount, the open extract collection chamber inlet flow valve (12) may be moved into closed position (of course, the controller (63) may play a role here in receiving data such as liquid level and perhaps valve positioning (open or closed), compare such data to a reference, and act accordingly, issuing an instruction to an electromechanical valve repositioner to change the valve position). Liquid carbon dioxide-liquid extract mixture retained in the sub-assembly (90) may, when a fluid level in the extract collection chamber (10) allows, flow downward, under gravity, through that sub-assembly (90)'s inlet/outlet port (96), to the extract collection chamber (10); the liquid carbon dioxide of such transferred mixture can then be vaporized in the extract collection chamber (10). Such flow (from sub-assembly (90) reservoir to extract collection chamber (10)) can occur, at least in part, due to gravity flow attributable to relative positioning of the discrete sensor sub-assembly (90) and the extract collection chamber (10), where the bottom interior surface of the discrete sensor sub-assembly (90) reservoir may (perhaps during manufacturing) be intentionally positioned higher than the bottom interior surface of the extract collection chamber (10). Pressure differential may potentially also play a role in such flow. Note that even where the discrete sensor assembly may appear to be within the extract collection chamber (10), it may still be considered discrete where the sensed quantity is of a mixture that is retained in a reservoir (of that sub-assembly (90)) that is separated (e.g., via a separating wall) from the chamber's enclosed inner volume, even though the two be fluidically connected.

In certain embodiments, the sensor might instead not be a part of any discrete sensor sub-assembly (90), as indeed it may be configured to directly sense the quantity of mixture in the extract collection chamber (10).

Figure 6:
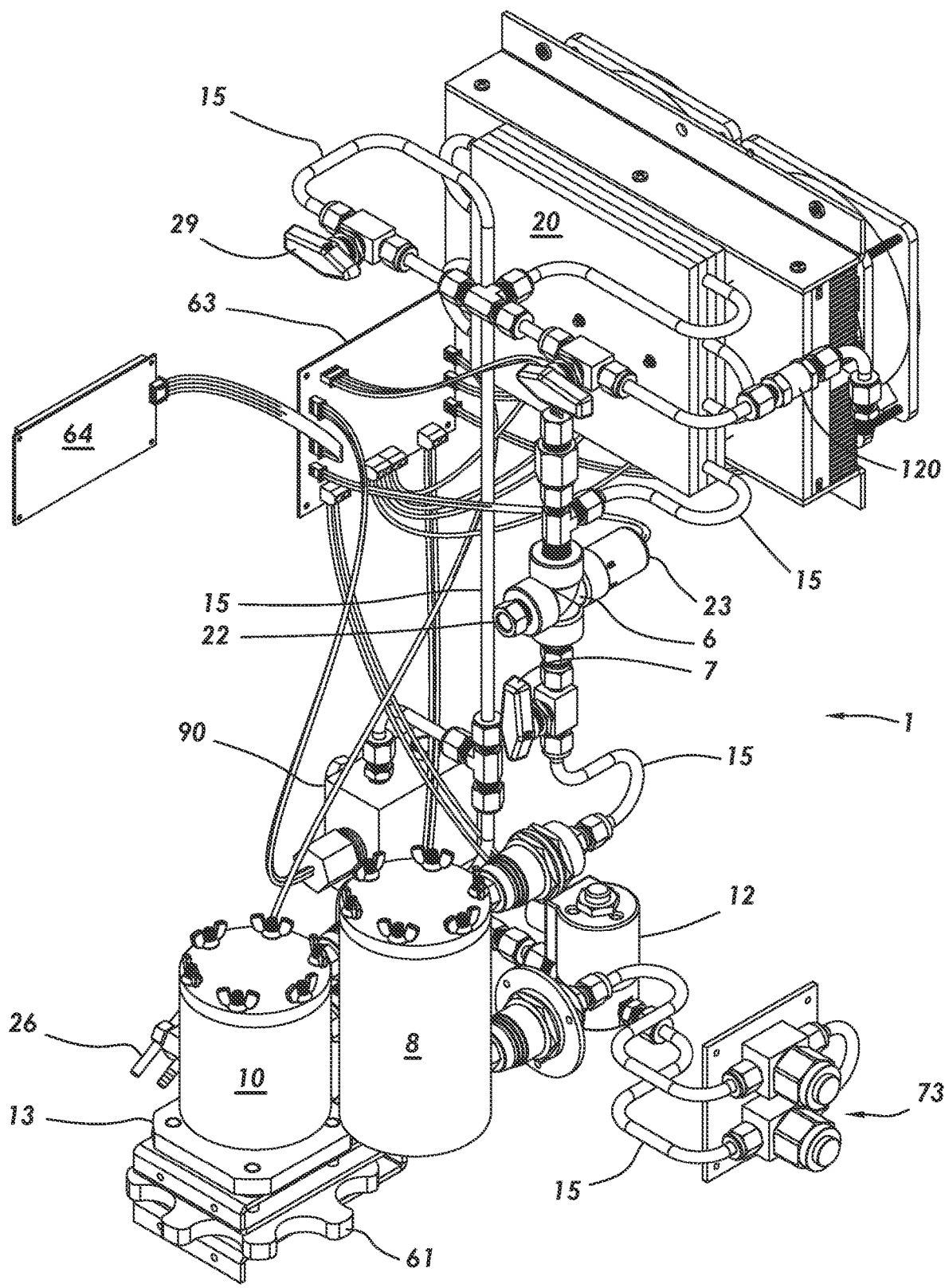
FIG. 6 is a front right aerial perspective view of an embodiment of the inventive technology without certain componentry, e.g., paneling, apparatus base, rear chassis assembly, and internal power supply.
Figure 11:
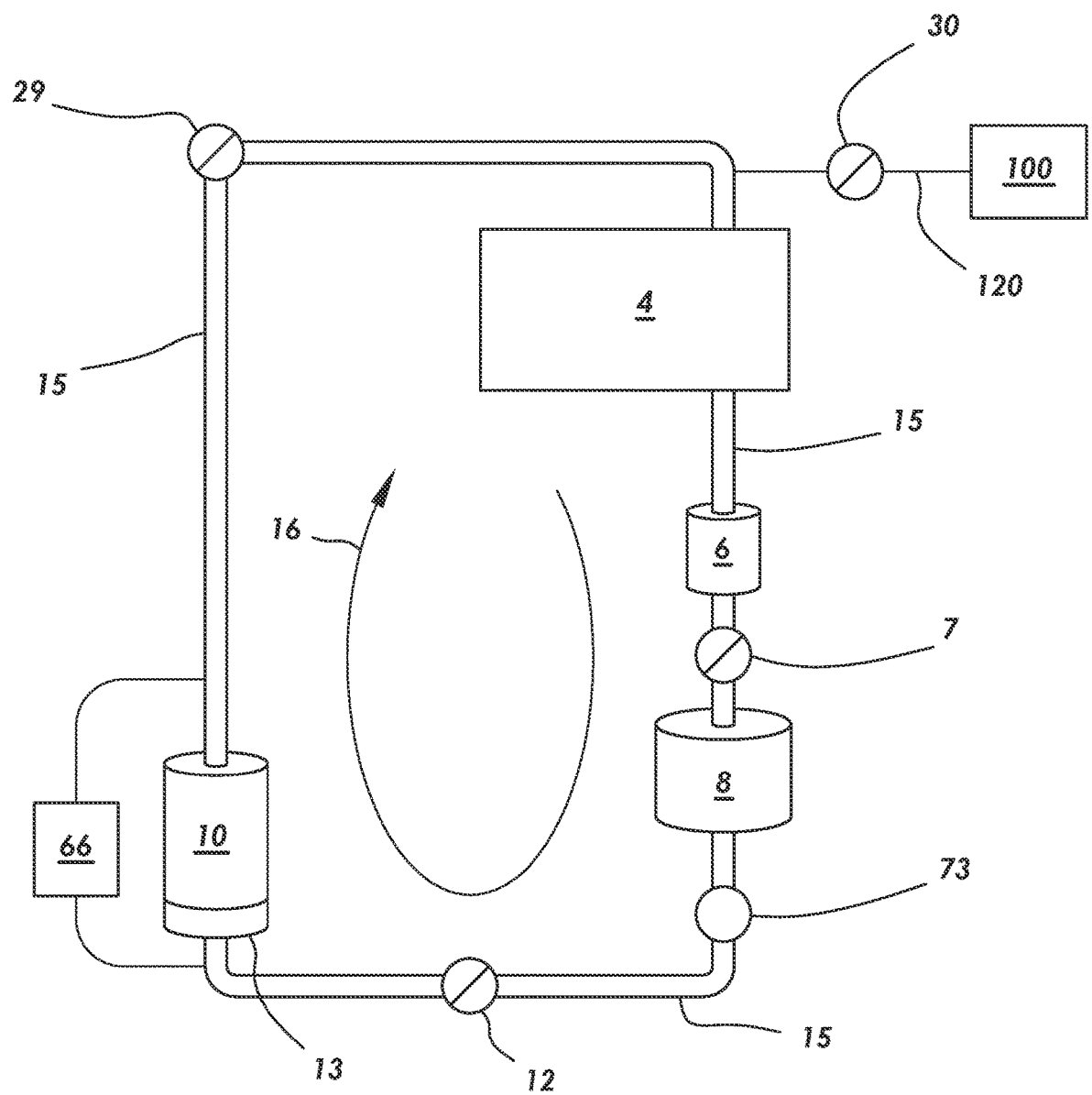
FIG. 11 is a front view of a conceptual presentation of an embodiment of the inventive technology.

Referring primarily to FIGS. 6, 7 and 11, the apparatus, in particular embodiments, defines a closed loop (16) (perhaps referred to as a recirculation loop), and components, e.g., chiller (4), metering reservoir, extraction chamber (8), certain valves and/or extract collection chamber (10) may be said to be established in-line with, even a part of, the loop (again, a carbon dioxide source is an example of a component that is established outside of the loop, and as such be referred to loop-external. The double line conduit of FIG. 11 illustrates the loop 16 as it passes through various components.

Referring primarily to FIGS. 6, 7 and 11, the looped flow may be enabled, at least in part, via fluidic coupling of various components in a looped configuration. Fluidic coupling may suggest the presence of some fluid conveyance componentry (15) (e.g., conduit, fittings, ports, and/or valves, as but a few examples) that is between or substantially at the components so coupled that enables flow of fluid between such components (e.g., due to gravity or pressure differential) even if, between such components, there are, e.g., in-line components such as reservoir(s), chamber(s), chiller, etc. As such, two components are fluidically coupled where there is fluid conveyance componentry (15) between or substantially at them, interconnecting such components. Even where an outlet port of component (e.g., chamber) abuts against an inlet port of another component, without any other componentry, such components may be said to be fluidically coupled via fluid conveyance componentry (15). Two components can be fluidically coupled even where, e.g., fluid is not emptied from or into either of such components (e.g., a first component whose fluid therefrom is carried (e.g., via conduit) to a second component without that fluid being emptied into that second component (e.g., where the second component is a chiller (4)) is still the to be fluidically coupled with that second component). As one can expect, any referenced chamber or reservoir that is fluidically coupled with another chamber or reservoir may have an inlet and an outlet (e.g., ports, and perhaps fittings).

Referring primarily FIGS. 6, 7 and 11, certain components may be said to be directly fluidically coupled, as where there is no intermediate componentry between those directly fluidically coupled components that significantly acts on the fluid to either heat it or chill it to change its phase (between liquid and gas), or to engage it with a matrix (e.g., plant biomass (3)). As such, certain other components, e.g., a valve, sensor or filter, can exist between components that are said to be directly fluidically coupled. The term "upflow," without more, suggests anywhere upflow (B may be said to be upflow of D even if C is established intermediately thereof), even though C may significantly act on the fluid to either heat it or chill it to change its phase (between liquid and gas), or to engage it with a matrix (e.g., plant biomass (3)). "Immediately upflow" or "immediately downflow" implies the absence of such componentry (i.e., that acts significantly on fluid in such manner) between referenced components. In certain embodiments (conceptually described in FIG. 11), "upflow" would be counterclockwise, and "downflow" would be clockwise.

Note that pressure differentials that (at least in part) may drive flow in the closed loop (16) (clockwise in FIG. 11) may be generated by the addition of heat (by the heater (13)) that vaporizes liquid carbon dioxide (thereby expanding it and increasing pressure), and the removal of heat (by the chiller (20)) that condenses the gaseous carbon dioxide (thereby reducing its volume and decreasing pressure). In certain applications, such differentials may be minor, but sufficient to drive flow in a direction and at a steady rate as desired, at times against gravity. In some applications, perhaps at least during initial looped flow, pressure differentials may, at least in part, be created by pressurized carbon dioxide input into the system from a loop-external carbon dioxide source (100).

Figure 5A:
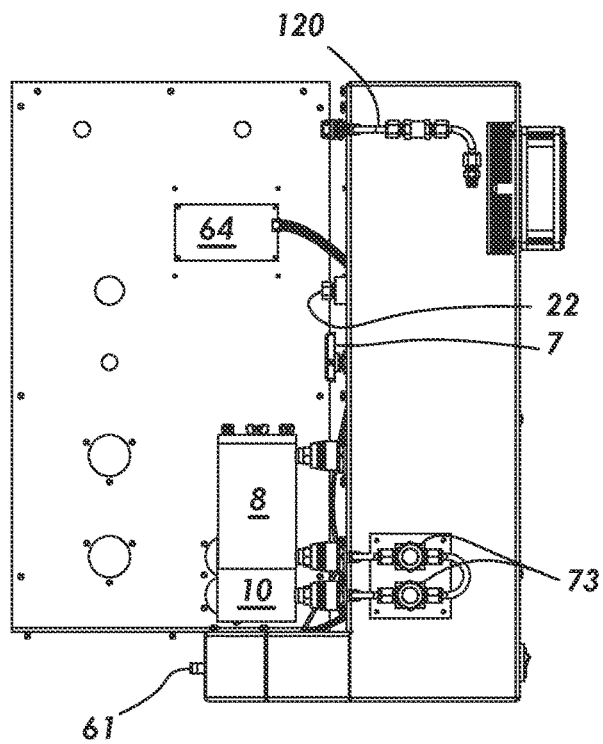
FIG. 5A shows a right side view of an embodiment of the inventive technology with front door open (at 90° angle).
Figure 5B:
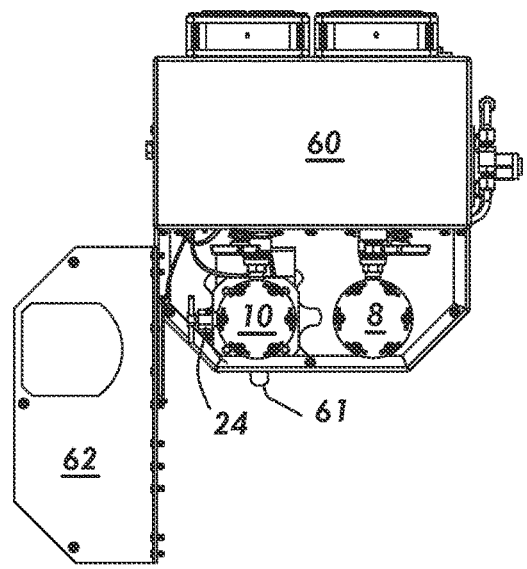
FIG. 5B shows a top view of an embodiment of the inventive technology with front door open (at 90° angle).
Figure 5C:
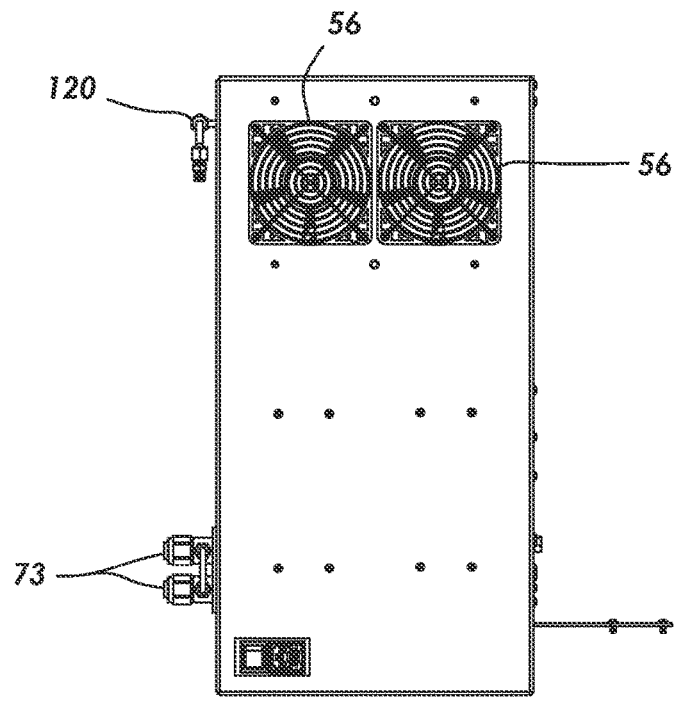
FIG. 5C shows a rear view of an embodiment of the inventive technology with front door open (at 90° angle).

Referring primarily to FIGS. 1, 4 and 5A, embodiments of the inventive technology may feature at least one filter assembly (73), perhaps including one or more filter frit(s), established so as to filter fluid, such as but not limited to the liquid carbon dioxide-liquid extract mixture, thereby filtering therefrom any materials, e.g., particulates, etc., whose removal from that fluid may be desired. Such filter assembly (73) can, in certain embodiments, be established in-line with fluid conveyance componentry (15), e.g., conduit, and may potentially be easily accessible by a user (by established outside of housing when it is closed) to facilitate removal and cleaning, perhaps between operational runs. The porosity of any frit(s) may be an appropriate size (including but not limited to between about 1 micron ("µm") to about 200 µm) depending upon the particulate size to be removed (filtered out), but such sizes are only exemplary, and not limiting. That particulate size may in certain applications be at least about 5 mm, at least about 0.5 millimeter ("mm"), or at least about 0.05 mm, or at least above 0.005 mm, again, not limiting ranges. Certain embodiments may feature frits with two different micron sizes, including but not limited to 15 µm and 2 µm, each inline, with the smaller size downflow of the larger size.

Several functionalities can be automatic and/or manual. Automated valve functionality may be enabled by, e.g., a sensor (e.g., quantity sensor, flow rate sensor, as but two examples), controller (63), and electromechanical valve positioner (e.g., servo-actuator) to automatically achieve closed, open or intermediate valve position. Such may achieve a flow-related goal (e.g., zero flow, fully open flow, or intermediate flow), perhaps to achieve a performance target. Other process controls (e.g., heating, chilling, etc.), e.g., to meet a performance target (e.g., parameter target, e.g., fluid temperature and/or pressure within a target range), can perhaps be achieved automatically, e.g., via sensors (e.g., quantity such as mass or volume sensor, flow rate sensor, EM wave (e.g., optical) sensor, optical sensor, pressure sensor, temperature sensor, etc.), controller, and appropriate componentry, which may include but is not limited to: heater (13) adjustment, chiller (20) adjustment.

Referring primarily to FIGS. 1, 4 and 5A, particularly with respect to certain manually operable valves, a viewing port may be established to allow visible inspection of liquid (e.g., liquid carbon dioxide or liquid carbon dioxide-liquid extract mixture) in, e.g., a chamber or reservoir. Note that a viewing port can be used in other applications, unrelated to manual valve operation, e.g., to provide liquid accumulation information usable by a user to, e.g., adjust heating (or perhaps even chilling). Any viewing port might possibly be paired with a light (22) (e.g., a LED light) configured to shine through the liquid and outside of the apparatus to facilitate visual determination of liquid level.

Figure 9:
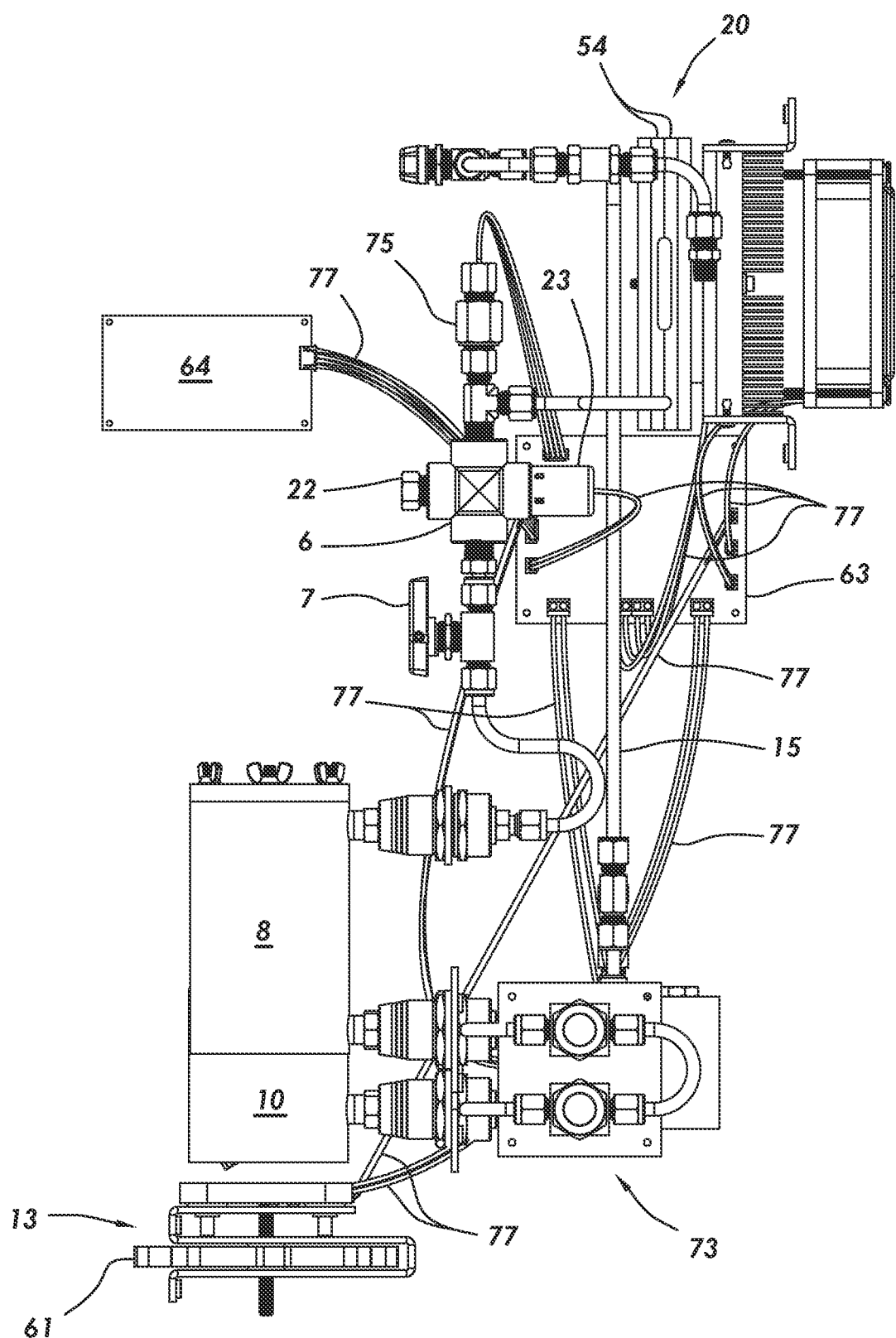
FIG. 9 is a right side view of an embodiment of the inventive technology without certain componentry, e.g., paneling, apparatus base, rear chassis assembly, and internal power supply.
Figure 10:
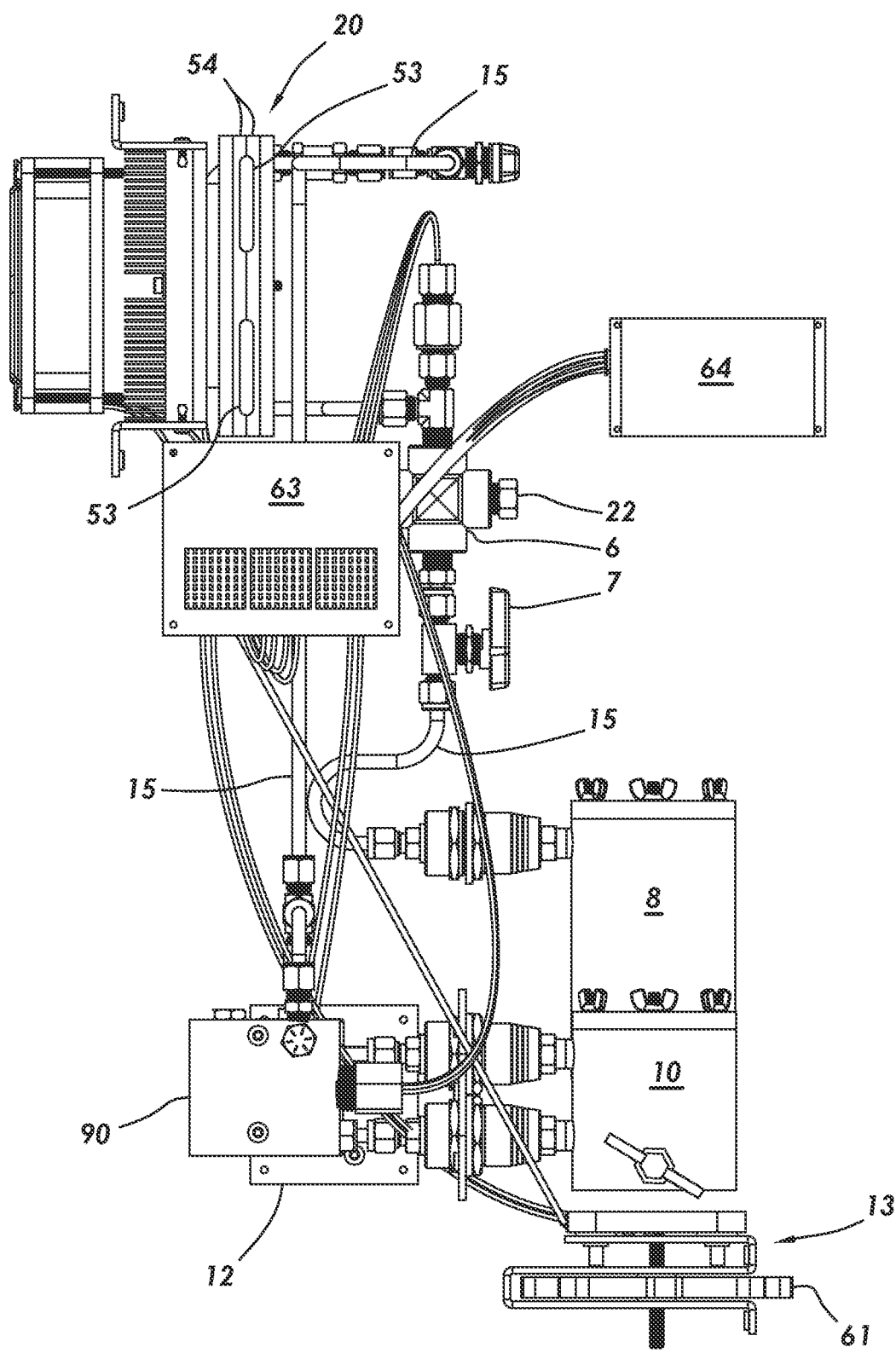
FIG. 10 is a left side view of an embodiment of the inventive technology without certain componentry, e.g., paneling, apparatus base, rear chassis assembly, and internal power supply.

Referring primarily to FIGS. 4, 7 and 9, the apparatus may use power from an external power supply (e.g., grid or battery, as but two examples) to power any of the various power consuming components it may include (e.g., heater (13), controller (63), display (64), chiller (20), sensor(s), electromechanical valve positioners, etc.). In certain embodiments, power such as grid power, via a corded plug, may be delivered to the apparatus which may convert such to a lower voltage (e.g., 12V DC and/or 24V DC, as but a few examples) via an (internal) power supply, which itself may include componentry necessary to achieve such conversion, e.g., transformer or voltage converter and/or alternating to direct current converter, etc., as may be known. However, the apparatus is certainly not limited to DC and/or low voltage, as a wide variety of power modalities can be used to power the apparatus' various components as required by the components themselves. Certain embodiments may also feature a bus bar (e.g., DC bus bar (121)) that is electrically connected to, e.g., an internal power supply (e.g., internal DC power supply (122)), to which power cable(s) for the various components may be connected.

Figure 8:
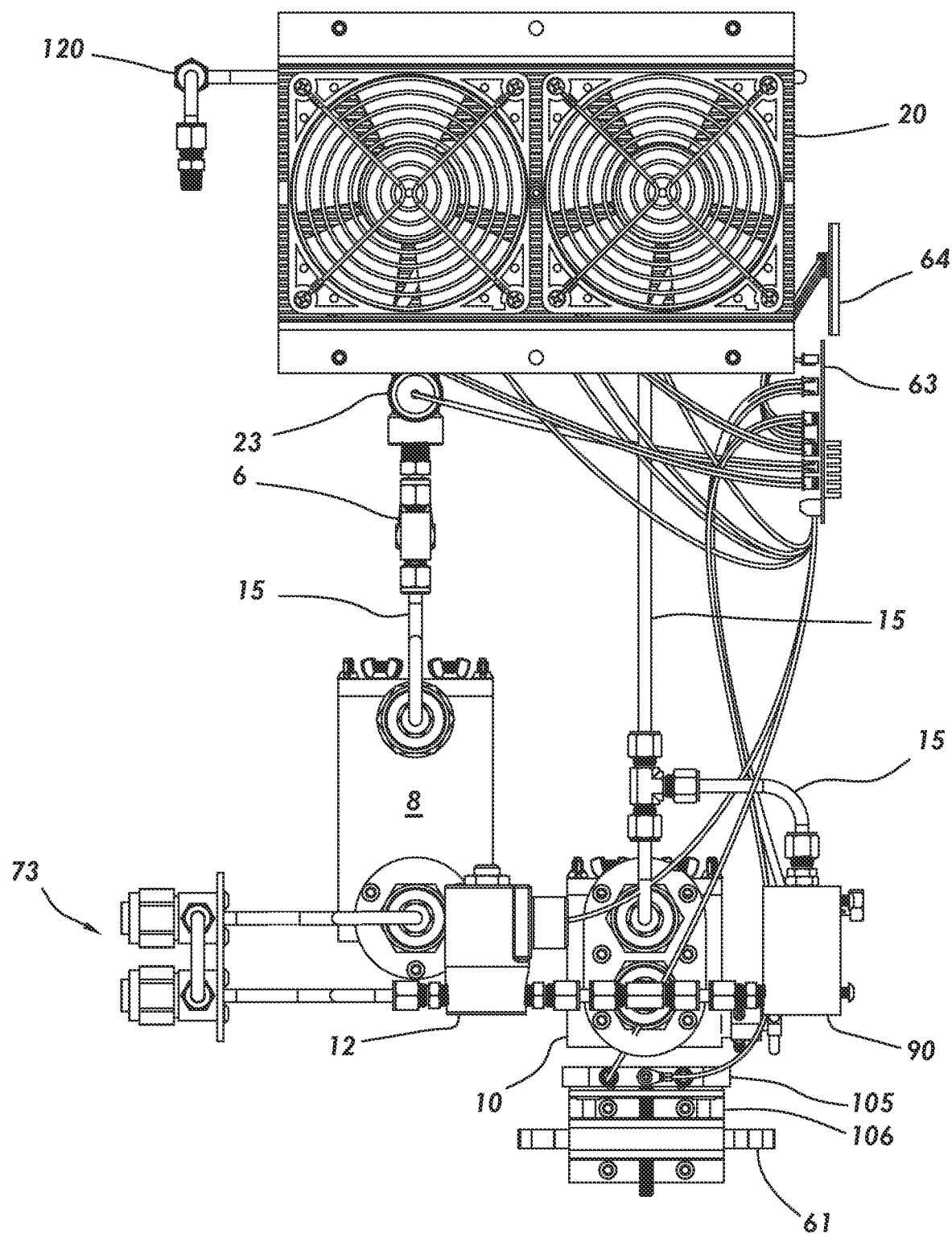
FIG. 8 is a rear view of an embodiment of the inventive technology without certain componentry, e.g., paneling, apparatus base, rear chassis assembly, and internal power supply.

Referring primarily to FIGS. 6, 7 and 8, embodiments may feature a controller (63) (e.g., processor, circuit board, PCB and/or computer, as but a few examples) that may be a programmable controller, operable to control the operation of one or more of flow rate (e.g., by controlling the position of a valve (open, closed, or possibly intermediate position), fluid temperature and/or fluid pressure (of any fluid at any location in the system, e.g., of mixture in the extract collection chamber (10), liquid carbon dioxide in the metering reservoir, liquid carbon dioxide in the extraction chamber (8), carbon dioxide in the chiller (20), gaseous carbon dioxide between the extract collection chamber (10) and the chiller (20), etc.). Control of the chiller (20) may be achieved, in certain embodiments, at least in part, via a chiller control chip.

Referring primarily to FIGS. 6, 7 and 8, programming may enable automatic achievement of parameter or other performance target(s), e.g., ranges of temperature (e.g., with respect to chiller (20) and carbon dioxide entering, in, or as leaving the chiller (20) and/or with respect to the heater (13) and fluid heated thereby), processing speed, pressure, flow rate, flow termination or commencement upon reaching a certain contained fluid quantity, perhaps via use of sensor(s) and potentially feedback-based adjustment to achieve such target(s). For example, a (low or high) temperature of liquid in the extract collection chamber (10) can be sensed, communicated to the controller (63), compared with a predetermined value(s), in response to which the controller (63) can then increase or decrease the heat applied by the heater (13) via a signal that the controller (63) sends to the heater (13). That temperature can perhaps be re-sensed, communicated to the controller (63), etc., using a feedback loop to achieve a desired, target temperature. Examples of valve-related performance targets may include flow rates, e.g., zero flow (closure of extract collection chamber inlet flow valve (12) when a sensed (directly or indirectly) level of liquid in such chamber reaches a certain height), or fully opened flow (opening of metering reservoir valve (7) when a liquid level sensor senses that the surface level of liquid in the metering reservoir has reached a certain height). As mentioned, where appropriate, the control may involve a continual (including sufficiently frequent) re-sensing of a relevant quantity. Of course, in order to achieve such control, sensed parameter values may be communicated, e.g., electronically, to the controller (63), and instructions to achieve the regulation needed to meet a performance target (e.g., fluid temperature in the chiller (20), fluid temperature in the extract collection chamber (10), flow as depending on sensed liquid quantity, etc.) may be sent to the performance-affecting component (e.g., heater (13), chiller (20), or valve, as but three examples).

When valves are automatically controlled, there may be a need for some electromechanical device such as but not limited to a servo-actuator, that can move valve position in accordance with electronic instructions sent to it. In certain embodiments, to achieve the desired control, whether with respect to valves or other componentry, one or more processing steps defined by one or more processing programs contained in a controller memory may be executed by a controller processor that is communicatively coupled to that memory.

Referring primarily to FIGS. 6, 7 and 8, a display (64) may be provided in order to visually communicate process performance (or other) parameters or operational conditions (e.g., presence of looped flow) that may be desired by a human user of the apparatus. Such parameters and conditions may include but are not limited to any sensor value mentioned herein (e.g., temperature, pressure, liquid level, flow rate, etc.), target values or ranges (e.g., temperature range and/or pressure range), user selections, elapsed time of operation or since operational event (e.g., start of closed loop processing), and anticipated time until completion of extract production. Additional information displayed may include indication of effective termination of processing (e.g., as indicated by elapsed time, sensed pressure value(s), a sensed continuous opening of the extract collection chamber inlet flow valve (12) and/or significant reduction in flow rate in the closed loop (16), etc.), perhaps in conjunction with audible alarm, SMS communication, etc.

Referring primarily to FIGS. 6, 7 and 8, there may also be provided an input interface (e.g. LCD or other type, whether touch-type and also serving as a display (64) or discrete from any display) usable by an operator of the apparatus to input any information or instruction, including but not limited to, e.g., operational time, parameter targets such as temperature ranges (e.g., for the liquid carbon dioxide-liquid extract mixture as heated in the extract collection chamber (10), internal pressures, etc.), instructions to power on certain components (e.g., power on the heater (13)), power off, adjust certain components (e.g., adjust heater (13)), etc.

Referring primarily to FIGS. 7-9, embodiments may feature cabling (77) (e.g., power wire(s), data cable(s), fiber optic, electric), generally anything that can convey power and/or data (e.g., sensed parameter value, input data, instructions, etc.) to and/or from various components such as the controller (63), heater (13), sensor(s), automatic valve(s), heater (13), chiller (4), chiller fan (56), display (64), controller (63), viewing port light (22), automatic valve position controller(s), any power-consuming component, etc. As such, sensor signals, controller instructions, other electronic communications, and any powering may be achieved, in part, via, e.g., communication cabling, display cabling, powering cabling, pressure sensor cabling, temperature sensor cabling, chiller fan cabling, chiller cabling, TEC module (s) cabling, heater (13) cabling, controller cabling, liquid level sensor cabling, electromechanical valve repositioner (e.g., servo-actuator) cabling, lighting cabling, clock cabling, etc.

Referring primarily to FIGS. 1, 2A-D, and 3, certain embodiments of the apparatus may be referred to benchtop or tabletop in that it may fit onto a bench/table, perhaps even being mobile, as a compact unit (exemplary size may be about 33.2" high, 12.4" wide, and 19.3" deep, as but one of many possible sizes), generally less than 3' high, 3' wide, and 2' deep (although such range is only exemplary, and not limiting whatsoever). Certain embodiments may feature casing, e.g., paneling (60) established to at least partially cover or encase internal componentry, perhaps on one or more side(s), thereby protecting such internal componentry and/or providing a more commercially aesthetic product. Certain embodiments may include a front door (62) that, upon repositioning (e.g., swinging outward about a vertical or other oriented hinge) can expose internal components. Certain embodiments with such a door (62) may first require removal and/or repositioning of certain external components (e.g., extraction chamber (8) and/or extract collection chamber (10), perhaps even certain manual valves). Embodiments may feature an apparatus base (74) to provide a sturdy foundation for apparatus componentry. External presentation of certain components can allow for, e.g., refilling (e.g., with plant biomass (3)) of the extraction chamber (8) and perhaps cleaning of either or both of the two aforementioned chambers between operational runs, perhaps without needing to remove or open any paneling (60) to access such components. In certain embodiments, a vertical rear panel may serve, at least in part, as a chassis assembly (providing an attachment site and support for certain components, e.g., the chiller). Note that quick-connect fittings, e.g., inlet or outlet fittings (or lid fastening fittings, may be used to facilitate removal and re-installation of certain components such as but not limited to the extraction chamber (8) and/or the extract collection chamber (10).

Referring primarily to FIGS. 1, 3, 6 and 7, generally, operation of the apparatus may, in particular embodiments and applications, involve an initial placement of an amount (e.g., a few ounces in certain applications, from perhaps 10 g-80 g, as but two of many possible examples) of biomass in the extraction chamber (8), then perhaps sealing that chamber "pressure-tight" closed, then charging of the system by inputting into its closed loop a sufficient quantity of carbon dioxide from the loop-external carbon dioxide source (100) (whether that source is gaseous or liquid, pressurized at a value within 500 psi to 1200 psi, as but one possible range). Such charging of the system may involve, e.g., an initial delivery of carbon dioxide from the loop-external carbon dioxide source (100) via opening of a carbon dioxide source inlet flow valve (30) (e.g., established outside of the loop) to a site on the loop that is between the extract collection chamber (10) and the chiller (20). Such initial delivery, perhaps after passing through the chiller (20) (so gaseous carbon dioxide from the loop-external gaseous carbon dioxide source is phase changed, or liquid carbon dioxide from a loop-external liquid carbon dioxide source is set to within appropriate condition ranges, e.g., temperature range), may accumulate in the fluid metering reservoir (6) (when a metering reservoir valve (7) downflow of it is closed). Then, when a quantity of such accumulated carbon dioxide in the reservoir reaches a pre-determined, perhaps marked, level, a carbon dioxide source inlet flow valve (30) may be closed (either manually by a user, e.g., observing the liquid level in the reservoir through an illuminated viewing port (22), or automatically when such automatic functionality is provided) and the metering valve may be opened, either automatically or manually. Opening of that metering reservoir valve (7) may effect an emptying of that carbon dioxide (in the metering reservoir) into the extraction chamber (8).

Referring primarily to FIGS. 1, 3, 6 and 7, the charging process (e.g., operation of the carbon dioxide source inlet flow valve (30) and the metering reservoir valve (7)) may be repeated as necessary in order to charge the closed loop (16) with a sufficient amount of carbon dioxide for processing of an amount of plant biomass (3) contained in the extraction chamber (8) (such amount of carbon dioxide as may be indicated in manuals or experientially determined). One of many procedures to do so may be as described in the more specific enumerated instructions indicated below.

Referring primarily to FIGS. 1, 3, 6 and 7, upon adequately charging the system (and opening the metering reservoir valve (7)), the cycling of the closed loop (16) process may be initiated by opening, e.g., a loop flow termination valve (29) (if it is closed), and perhaps powering the heater (13) and associated sensor (e.g., the quantity sensor) and perhaps automatic valve (12) via, e.g., manually manipulating a switch (if such are not powered up, as may have occurred via powering of the entire unit). In addition to preventing looped flow, that termination valve (29) (when closed) may also prevent reverse flow of carbon dioxide from the loop external carbon dioxide source. Note that where the extract collection chamber inlet flow valve (12) is closed (which, as described herein, may occur temporarily, when a quantity in that chamber reaches a certain upper limit), if other valves in the loop are open, then the system is still viewed as undergoing looped operation. Notably also is that the apparatus may be considered as operating even when it's just charging with carbon dioxide from the source (although such may not be considered looped operation). After such charging (and opening of valves to allow for closed loop flow), operation may be referred to as closed loop operation, again, even when the extract collection chamber inlet flow valve (12) is (temporarily) closed.

Referring primarily to FIGS. 1, 3, 6 and 7, carbon dioxide input into the closed loop (16) may, after passing through the chiller (20) (and being converted to liquid carbon dioxide if the source is of gaseous carbon dioxide), and then through the fluid metering reservoir (6), may then enter the extraction chamber (8), where it contacts the plant biomass (3) placed earlier therein, and dissolves extract in such plant biomass (3), thereby generating a liquid carbon dioxide-liquid extract mixture (which may be, at least in part, a solution, perhaps having admixed therein additional plant components such as but not limited to particulates). That mixture may then be output from the extraction chamber (8) and conveyed to and through a filter assembly (73) so that particulates, solid residue, etc., and other substances that are undesired in the final produced extract, can be removed from the mixture. The mixture may then proceed (due to, e.g., pressure differential within the closed loop (16) and/or gravity, either or both possibly responsible for motion of fluid at any point within the closed loop (16)) to the extract collection chamber (10), where it may be heated (note that in certain applications, a heater (13) might not be necessary for vaporization (conversion to gas) of the liquid carbon dioxide, as indeed room temperature may be sufficient to cause such phase change under certain pressures). Such heating may be controlled to vaporize the liquid carbon dioxide of the liquid carbon dioxide-liquid extract mixture, but not vaporize the liquid extract of that mixture, thereby leaving behind liquid extract. Note that, as discussed herein, an valve (automatic in certain embodiments) established to control flow of the mixture into the extract collection chamber (10) (an extract collection chamber inlet flow valve (12)) may be left open until a certain quantity of the liquid mixture is contained in that chamber, at which point such valve may be closed, thereby enabling vaporization of liquid carbon dioxide in the extract collection chamber (10), prevention of overfilling of the extract collection chamber (10), and/or more controlled vaporization in that chamber. Such vaporization may generate pressure that may be needed to move fluid (here, gaseous carbon dioxide) back to the chiller (20) (possibly against gravity), and may produce the liquid extract as liquid left remaining in the bottom of the extract collection chamber (10). Gaseous carbon dioxide so moved to the chiller (20), may then be chilled (have its temperature lowered) sufficiently to convert it to liquid carbon dioxide at the pressure(s) such gaseous carbon dioxide passes through the chiller (20). The liquid carbon dioxide from the chiller (20) may then be passed through the fluid metering reservoir (6) and the metering reservoir valve (7) (which typically would be open at such time, during closed loop system operation, i.e., after the system is sufficiently charged), then again to the extraction chamber (8) to extract more extract therefrom. Accordingly, the apparatus may be said to be operable to deliver carbon dioxide to the carbon dioxide chiller (20) from either the loop-external carbon dioxide source (100) or the extract collection chamber (10) (both such components are fluidically coupled with the chiller (20)).

Referring primarily to FIGS. 1, 3, 6, 7 and 11, the cycling and associated recirculation of the carbon dioxide through the closed loop (16) may continue (under one of many different applications, the system cycled for four hours before completion) until, e.g., a pre-determined time has elapsed or other termination signaling event has occurred (such as, but not limited to, the termination of automatic closing of the extract collection chamber inlet flow valve (12)), perhaps exhibiting hundreds of completed loops (conceptually of an isolated carbon dioxide molecule).

Referring primarily to FIGS. 1, 3, 6, 7 and 11, note that closed loop operation may, in certain applications, feature an initial warm-up period and then perhaps more steady state looped operation. After any warm-up period, as seen in certain embodiments and applications, vaporization (in the extract collection chamber (10)), condensation (as caused by the chiller (20)), and removal of extract (in the extraction chamber (8)) may be occurring simultaneously. Upon termination of the looped flow processing at least in part as caused by closing of the loop flow termination valve (29), any liquid extract removal componentry (24) provided may be operated, either manually or perhaps even automatically, to effect flow of the liquid extract from the extract collection chamber (10). In such manner, extract initially contained within plant biomass (3) can be extracted therefrom and produced. Opening of such valve may also serve to depressurize the apparatus.

Referring primarily to FIGS. 1, 3, 6, 7 and 11, note that particular applications of certain embodiments of the inventive technology may involve the adjustment of heating, chilling (where such is in fact adjustable), flow rates (perhaps by manually adjusting valve(s)), pressure(s) (e.g., via adjusting heater (13) or chiller (20)), etc., to achieve processing as desired, such as achieving or assuring sub-critical flow (of carbon dioxide in its closed loop), completing extraction within a certain amount of time, avoiding vaporization of extract, changing system pressure, temperature to within designated acceptable ranges for an application (e.g., for production of a specific extract from a specific plant) and/or achieving slower, more gentle extraction that may be selective to certain desired extracts (e.g., flavonoids, etc.), but de-selective to (e.g., not extract) certain less desired components (e.g., waxes, lipids, etc.).

Referring primarily to FIGS. 1, 3, 6, 7 and 11, such adjustments may, in particular applications, be used to not only maintain and/or change phase as desired, but also, e.g., cause a substantial balancing between the heating and chilling, such that vaporization caused by a heater (13) is substantially close in value to the condensation caused by the chiller (20) (e.g., the system is vaporizing carbon dioxide substantially as fast as it is condensing it), while still maintaining any pressure differential necessary to achieve looped flow rates as desired for an application. Excessively unbalanced operation may cause, e.g., an accumulation (gradual or fast) of liquid mixture in the extract collection chamber (10) (and an overly frequent closing of the extract collection chamber inlet flow valve (12)), an unnecessarily slow processing speed and/or build up of excessive pressures in part of the system, as but a few possible consequences. Excessively frequent closing and opening of an automatic extract collection chamber inlet flow valve (12) may signal unbalanced operation, which may be resolved, at least in part, by adjusting the heater (13) to increase the heat transferred to the liquid mixture contents of that chamber, thereby increasing rate of vaporization of the liquid carbon dioxide of such mixture and lowering its quantity in the extract collection chamber (10).

An exemplary set of instructions for use of the apparatus for particular applications may be as follows:

Initiating Looped Flow Operation:
1. Ensure all valves are in the off position;
2. Turn System Power on;
3. Connect loop external carbon dioxide source (e.g., $CO_2$ gas tank);
4. When a chiller (20) temperature sensor reads a steady temperature, open the valve on the $CO_2$ tank;
5. Open carbon dioxide source inlet flow valve (30); wait until viewing port (22) (into fluid metering reservoir (6)) is full of liquid CO, then close that valve;
6. Open metering reservoir valve (7); allow liquid $CO_2$ to flow into the extraction chamber (8);
7. When the liquid drops and there is no more liquid in the sight glass, close metering reservoir valve (7);
8. Repeat step 5 until you have reached the desired amount of $CO_2$ or the extraction chamber is full (note: if liquid $CO_2$ does not drop when the metering valve is open, the vessel is full);
9. Close valve on the $CO_2$ tank;
10. If not powered on automatically upon system power on, then power heater (13), automatic valve (12) and sensor (91) of the discrete sensor sub-assembly (90) to start the $CO_2$ vaporization process; and
11. Open loop flow termination valve (29). The system is now open and recirculating $CO_2$ passively, without a pump.

Adding $CO_2$ to the System:

This process may be necessary if there is a loss of pressure to the system or in order to terminate the looped flow operation so as to harvest material during extraction, or if there is not enough $CO_2$ in the system.
1. Turn off heater (13);
2. Close carbon dioxide source inlet valve (30), looped flow termination valve (29) and metering valve;
3. Open valve on $CO_2$ tank;
4. Open carbon dioxide source inlet flow valve (30) until desired PSI is reached or desired $CO_2$ is added to the system;
5. Close carbon dioxide source inlet flow valve (30);
6. Open metering reservoir valve (7);
7. Turn on the heater (13); and 8. Open loop flow termination valve (29) to resume the recirculation process.

Harvesting Steps:
1. Close metering reservoir valve (7);
2. Turn power off;
3. Close loop flow termination valve (29); and
4. Open liquid extract delivery valve (26) slowly to obtain produced extract and evacuate remaining $CO_2$ to vent to the atmosphere.

Referring primarily to FIGS. 1, 3, 6, 7 and 11, regardless of the precise operative steps taken, the temperature of gaseous carbon dioxide exiting the extract collection chamber (10) during closed loop operation of the apparatus (e.g., perhaps after a warm-up period of looped operation) may be selected from the following exemplary ranges (without limitation): about 40° C. to about 60° C., about 30° C. to about 50° C., about 20° C. to about 40° C., and about 10° C. to about 30° C., or combinations thereof. Common applications may feature a temperature of gaseous carbon dioxide exiting the extract collection chamber (10) during closed loop operation of the apparatus of about 40° C.

Referring primarily to FIGS. 1, 3, 6, 7 and 11, the temperature of liquid carbon dioxide exiting the carbon dioxide chiller (20) during closed loop operation of the apparatus (e.g., perhaps after a warm-up period of looped operation) may be selected from the following exemplary ranges (without limitation): about −15° C. to about −5° C., about −10° C. to about 0° C., and about −5° C. to about 5° C., or combinations thereof. Common applications may feature a temperature of liquid carbon dioxide exiting the carbon dioxide chiller (20) during closed loop operation of the apparatus of about −5° C.

Referring primarily to FIGS. 1, 3, 6, 7 and 11, differences in temperature between gaseous carbon dioxide exiting the extract collection chamber (10) and liquid carbon dioxide exiting the carbon dioxide chiller (20) during closed loop operation of the apparatus (e.g., perhaps after a warm-up period of looped operation) may be selected from the following exemplary ranges (without limitation): from about 70° C. to about 50° C., about 60° C. to about 40° C., about 50° C. to about 30° C., and about 40° C. to about 20° C., or combinations thereof. Common applications may feature a temperature range of about 35° C.

Referring primarily to FIGS. 1, 3, 6, 7 and 11, the pressure of carbon dioxide entering the carbon dioxide chiller (20) during closed loop operation of the apparatus (e.g., perhaps after a warm-up period of looped operation) may be selected from the following exemplary ranges: about 400 psi to about 600 psi, about 500 psi to about 700 psi, about 600 psi to about 800 psi, less than about 900 psi, about 800 psi to about 100 psi, about 900 psi to about 1100 psi, about 1000 psi to about 1200 psi, about 1100 psi to about 1300 psi, about 1200 psi to about 1400 psi, about 1300 psi to about 1500 psi, and about 1600 psi to about 1700 psi, or combinations thereof. Common applications may feature a pressure of carbon dioxide entering the carbon dioxide chiller (20) during closed loop operation of the apparatus of from about 600 psi to about 900 psi. While pressure of carbon dioxide entering the carbon dioxide chiller (20) may be the maximum pressure in the closed loop (16) for certain applications using certain embodiments, such pressure may still be representative of pressure in the entire closed loop during such closed loop operation, as pressure differentials in the system may be relatively small (e.g., less than 40 psi, less than 20 psi, or less than 10 psi, as but a few examples) during such operation.

Referring primarily to FIGS. 1, 3, 6, 7 and 11, because certain embodiments of the inventive technology may continue to operate (e.g., recirculate fluid in a closed loop (16)) without any pump(s), such embodiments may be characterized as achieving passive, pump-free, closed loop processing (note that any pump used to generate pressure of carbon dioxide in a loop-external carbon dioxide source (100) is not considered a pump of the apparatus, so even if such pump were to exist, processing may still be characterized as passive and pump-free). Pumped flow of an extractant (e.g., carbon dioxide) repeatedly through a matrix (e.g., plant biomass (3)) may result in saturation, to at least some degree, of that extractant with extract or other substances from the matrix, which of course may compromise its effectiveness as a solvent. Advantages of certain embodiments of the inventive technology disclosed herein may relate to the absence of any sort of pump that is configured to drive the recirculating flow in the closed loop (16); instead, looped flow in particular embodiments of the inventive technology disclosed herein may be driven at least in part by gravity and/or pressure differentials generated by the heating of the liquid carbon dioxide-liquid extract mixture (and consequent vaporization of that liquid carbon dioxide) and chilling of the gaseous carbon dioxide by the carbon dioxide chiller (20) (and its effect of changing its phase to liquid). Indeed, the heating of the liquid carbon dioxide-liquid extract mixture (and consequent vaporization of that liquid carbon dioxide but not of the liquid extract) as seen in certain embodiments of the inventive technology may advantageously generate a "fresh" or clean carbon dioxide that is free of extract (that, after passage to and condensation by the chiller (20), can then be placed in contact with the plant biomass (3) to extract its extract). In such manner, pump-free (passive), closed loop processing as featured by certain embodiments may avoid extractant saturation and the compromise of processing it causes. Note that embodiments of the inventive may also feature a piston-free configuration.

Embodiments of the inventive technology may not only be inventive apparatus, but also inventive methods, e.g., methods of producing (including but not limited to manufacturing) and methods of using any of the various inventive apparatus. As used with respect to such method(s), "configuring" may refer to, potentially, e.g., establishing, arranging, designing, selecting (perhaps at times from conventionally known componentry) and/or connecting with fluid conveyance componentry (15), etc. in order to achieve an indicated functionality, result, advantage, feature, etc. (at times, perhaps even where not specified, such functionality, result, etc., may be observed or realized only during operation of the apparatus). Notably, with respect to apparatus and/or methods, reference (in a discussion in the written description of a certain aspect of the inventive technology) to a specific figure or figures does not mean that other figures might also provide subject matter that is also descriptive of such aspect.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which the inventive technology is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "chiller" should be understood to encompass disclosure of the act of "chilling"—whether explicitly discussed or not—and, conversely, were there effectively disclosure of the act of "chilling", such a disclosure should be understood to encompass disclosure of an "chiller" and even a "means for chilling." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the extraction systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application may provide a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A plant biomass extraction apparatus for production of liquid extract from plant biomass, comprising:
    a carbon dioxide chiller configured to chill carbon dioxide, said carbon dioxide exiting said chiller as liquid carbon dioxide;
    an extraction chamber established downflow of said carbon dioxide chiller, and configured to contain said plant biomass for extraction, said liquid carbon dioxide contacting said plant biomass to generate a liquid carbon dioxide-liquid extract mixture;
    an extract collection chamber established downflow of said extraction chamber;
    a heater configured to heat said liquid carbon dioxide-liquid extract mixture in said extract collection chamber to convert at least some of said liquid carbon dioxide of said liquid carbon dioxide-liquid extract mixture in said extract collection chamber to gaseous carbon dioxide, said liquid extract remaining in said extract collection chamber; and
    fluid conveyance componentry that fluidically couples said carbon dioxide chiller, said extraction chamber and said extract collection chamber to define a closed loop, said apparatus being pump free and operable to produce said extract from said plant biomass via passive, pump-free, closed loop processing.

2. A plant biomass extraction apparatus as described in claim 1, further comprising a loop-external carbon dioxide source.

3. A plant biomass extraction apparatus as described in claim 2, wherein said fluid conveyance componentry also fluidically couples said loop-external carbon dioxide source with said closed loop.

4. A plant biomass extraction apparatus as described in claim 1, further comprising a fluid metering reservoir configured to retain, for at least some time during operation of said apparatus, an amount of said liquid carbon dioxide output from said carbon dioxide chiller.

5. A plant biomass extraction apparatus as described in claim 4, further comprising a metering reservoir valve operable to control flow of liquid carbon dioxide from said fluid metering reservoir.

6. A plant biomass extraction apparatus as described in claim 5, wherein said fluid metering reservoir and said metering reservoir valve are established between said carbon dioxide chiller and said extraction chamber.

7. A plant biomass extraction apparatus as described in claim 5, wherein said fluid metering reservoir is conduit above said metering reservoir valve.

8. A plant biomass extraction apparatus as described in claim 4, further comprising a viewing port for visible inspection of level of fluid in said fluid metering reservoir.

9. A plant biomass extraction apparatus as described in claim 1, further comprising a liquid quantity sensor configured to sense a quantity of said liquid carbon dioxide-liquid extract mixture in said extract collection chamber.

10. A plant biomass extraction apparatus as described in claim 9, wherein said liquid quantity sensor comprises a liquid level sensor.

11. A plant biomass extraction apparatus as described in claim 9, further comprising an extract collection chamber inlet flow valve operable to control flow of said liquid carbon dioxide-liquid extract mixture into said extract collection chamber in response to said quantity of said liquid carbon dioxide-liquid extract mixture in said extract collection chamber sensed by said liquid quantity sensor.

12. A plant biomass extraction apparatus as described in claim 11, wherein said extract collection chamber inlet flow valve is automatically operable.

13. A plant biomass extraction apparatus as described in claim 11, wherein said extract collection chamber inlet flow valve automatically closes when a quantity of said liquid carbon dioxide-liquid extract mixture in said extract collection chamber reaches a pre-designated height.

14. A plant biomass extraction apparatus as described in claim 1, wherein said carbon dioxide chiller is a thermo-electric chiller.

15. A plant biomass extraction apparatus as described in claim 1, wherein said liquid carbon dioxide-liquid extract mixture is a solution.

16. A plant biomass extraction apparatus as described in claim 1, further comprising liquid extract removal componentry configured to enable delivery of said liquid extract from said extract collection chamber.

17. A plant biomass extraction apparatus as described in claim 16, wherein said liquid extract removal componentry comprises a groove on a bottom inner surface of said extract collection chamber for flow of said liquid extract.

18. A plant biomass extraction apparatus as described in claim 16, wherein said liquid extract removal componentry comprises a liquid extract delivery valve.

19. A plant biomass extraction apparatus as described in claim 1, further comprising a loop flow termination valve operable to stop looped flow in said closed loop.

20. A plant biomass extraction apparatus as described in claim 1, further comprising a filter assembly fluidically coupled with said extraction chamber downflow of said extraction chamber.

* * * * *